US012351232B2

(12) United States Patent
Cimatti

(10) Patent No.: US 12,351,232 B2
(45) Date of Patent: Jul. 8, 2025

(54) RETRACTABLE STEERING WHEEL ARRANGEMENT WITH NON-PLANAR STEERING WHEEL RIM

(71) Applicant: Hangzhou Kingway Technology Co., Ltd., Hangzhou (CN)

(72) Inventor: Franco Cimatti, Pavullo nel Frignano (IT)

(73) Assignee: Hangzhou Kingway Technology Co., Ltd., Hangzhou (CN)

( * ) Notice: Subject to any disclaimer, the term of this patent is extended or adjusted under 35 U.S.C. 154(b) by 0 days.

(21) Appl. No.: 18/578,285

(22) PCT Filed: Jul. 13, 2021

(86) PCT No.: PCT/EP2021/069481
§ 371 (c)(1),
(2) Date: Jan. 10, 2024

(87) PCT Pub. No.: WO2023/284948
PCT Pub. Date: Jan. 19, 2023

(65) Prior Publication Data
US 2024/0300566 A1    Sep. 12, 2024

(51) Int. Cl.
*B62D 1/06* (2006.01)
*B60K 35/21* (2024.01)
(Continued)

(52) U.S. Cl.
CPC .............. *B62D 1/06* (2013.01); *B60K 35/212* (2024.01); *B62D 1/046* (2013.01); *B62D 1/105* (2013.01);
(Continued)

(58) Field of Classification Search
CPC .......... B62D 1/06; B62D 1/046; B62D 1/105; B62D 1/185; B62D 5/006; B60K 35/212; B60K 2360/782
See application file for complete search history.

(56) References Cited

U.S. PATENT DOCUMENTS

D249,499 S * 9/1978 LeRose ................. B60K 35/00
74/552
5,152,358 A * 10/1992 Kozuka ................. B60K 35/00
200/61.54

(Continued)

FOREIGN PATENT DOCUMENTS

DE  102017007841 A1  2/2019
DE  102020100016 A1  7/2020
(Continued)

OTHER PUBLICATIONS

International Search Report and Written Opinion issued in International PCT Application No. PCT/EP2021/069481, dated Jul. 13, 2021, in 14 pages.

*Primary Examiner* — William C Joyce
(74) *Attorney, Agent, or Firm* — JCIPRNET

(57) ABSTRACT

The present disclosure relates to a steering system for a vehicle, comprising a steering wheel arrangement having a central axis and being reversibly retractable in a direction towards a dashboard of the vehicle and extendable in a direction away from the dashboard of the vehicle. The steering wheel arrangement includes a steering wheel having a steering wheel rim and at least one spoke, a steering wheel hub fixedly connected with the steering wheel by the at least one spoke and extending from the steering wheel towards the dashboard of the vehicle, the steering wheel hub and the steering wheel being rotatable about a central axis (A). The
(Continued)

steering wheel rim has a non-planar configuration and has a total angle of rotation of 720° or less.

17 Claims, 15 Drawing Sheets

(51) Int. Cl.
  *B62D 1/04* (2006.01)
  *B62D 1/10* (2006.01)
  *B62D 1/185* (2006.01)
  *B62D 5/00* (2006.01)

(52) U.S. Cl.
  CPC ............. *B62D 1/185* (2013.01); *B62D 5/006* (2013.01); *B60K 2360/782* (2024.01)

(56) References Cited

U.S. PATENT DOCUMENTS

| | | | | |
|---|---|---|---|---|
| 5,465,632 | A * | 11/1995 | Oki | B62D 1/187 |
| | | | | 74/484 R |
| 7,017,704 | B2 * | 3/2006 | Kapaan | B62D 1/046 |
| | | | | 180/315 |
| 10,988,161 | B2 | 4/2021 | Krstic et al. | |
| 2003/0164060 | A1 * | 9/2003 | Menjak | B62D 5/006 |
| | | | | 74/552 |

FOREIGN PATENT DOCUMENTS

| | | |
|---|---|---|
| DE | 102019134636 A1 | 6/2021 |
| EP | 3476692 A1 | 5/2019 |
| FR | 3099455 A1 | 2/2021 |

\* cited by examiner

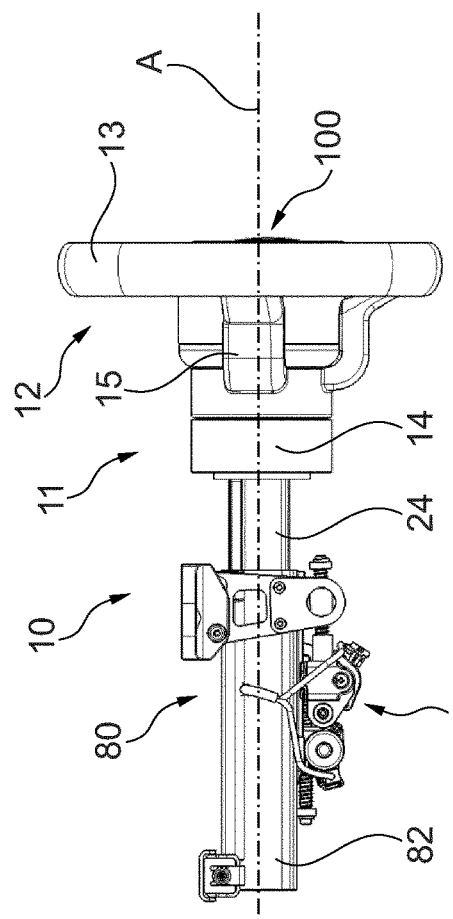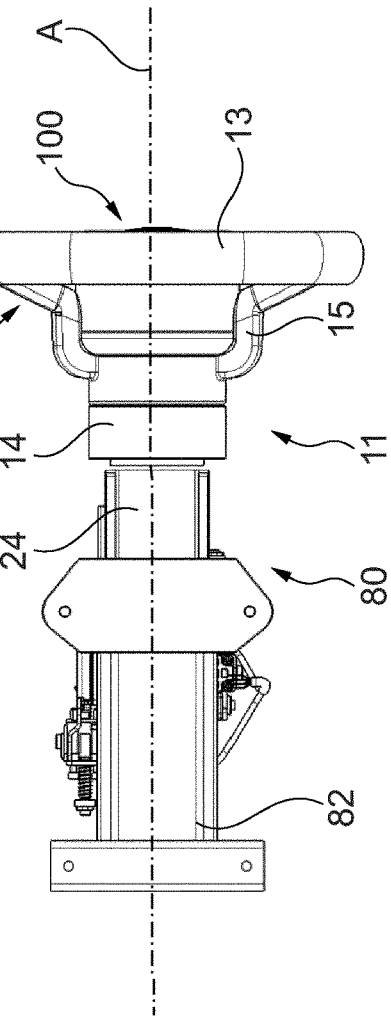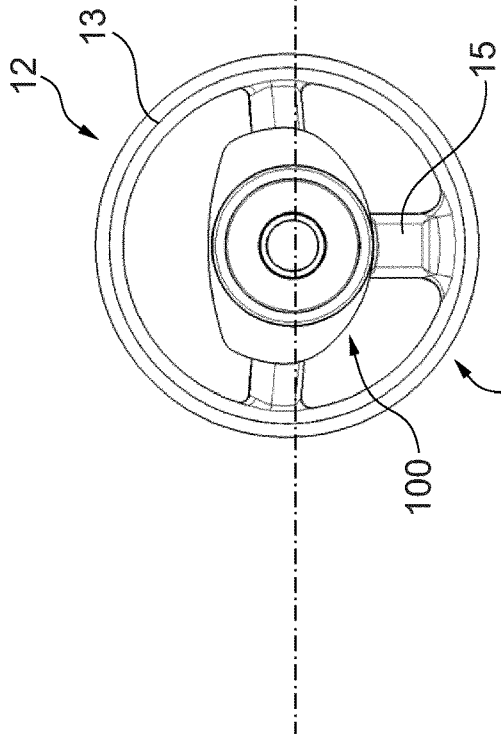

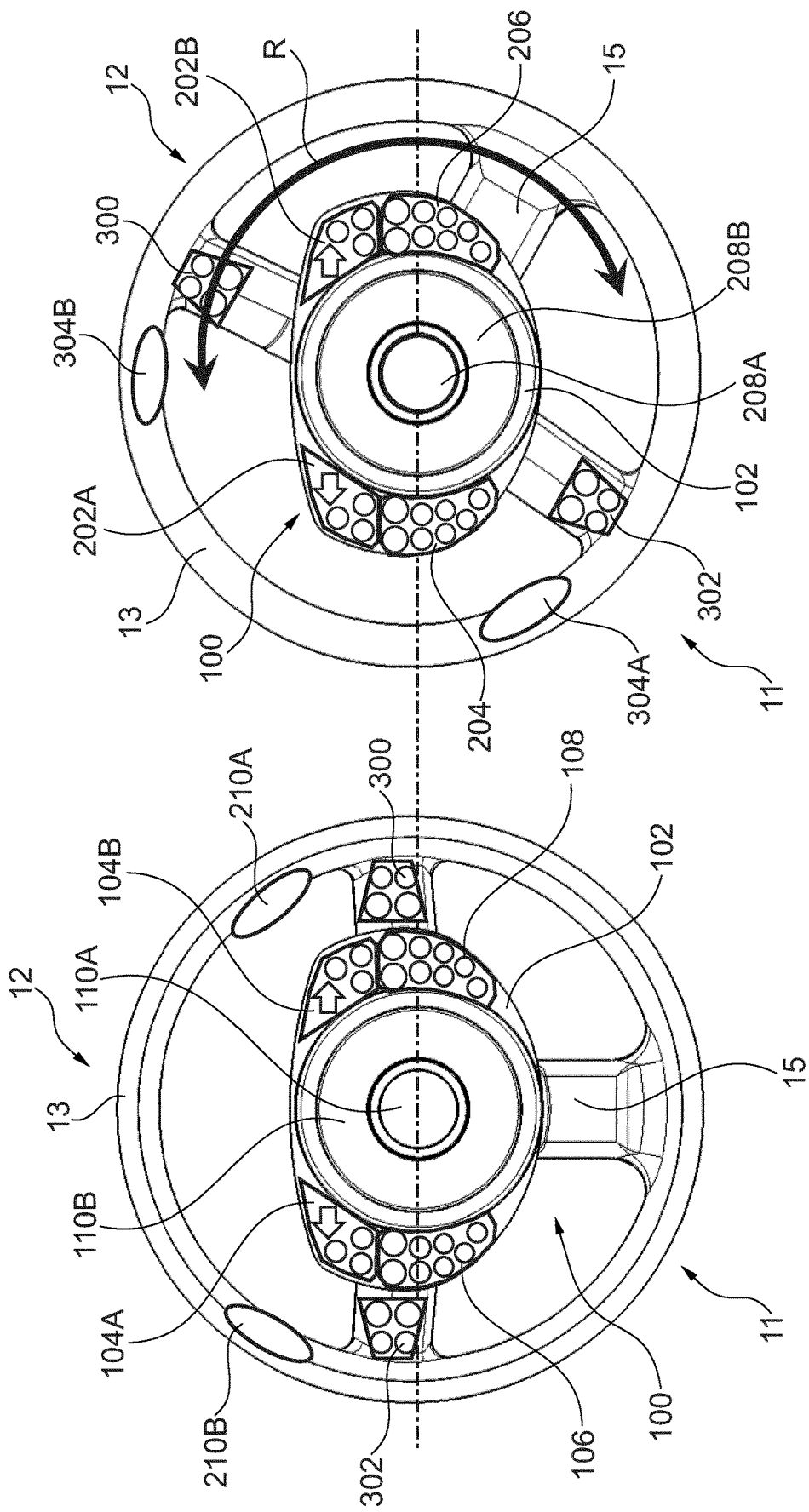

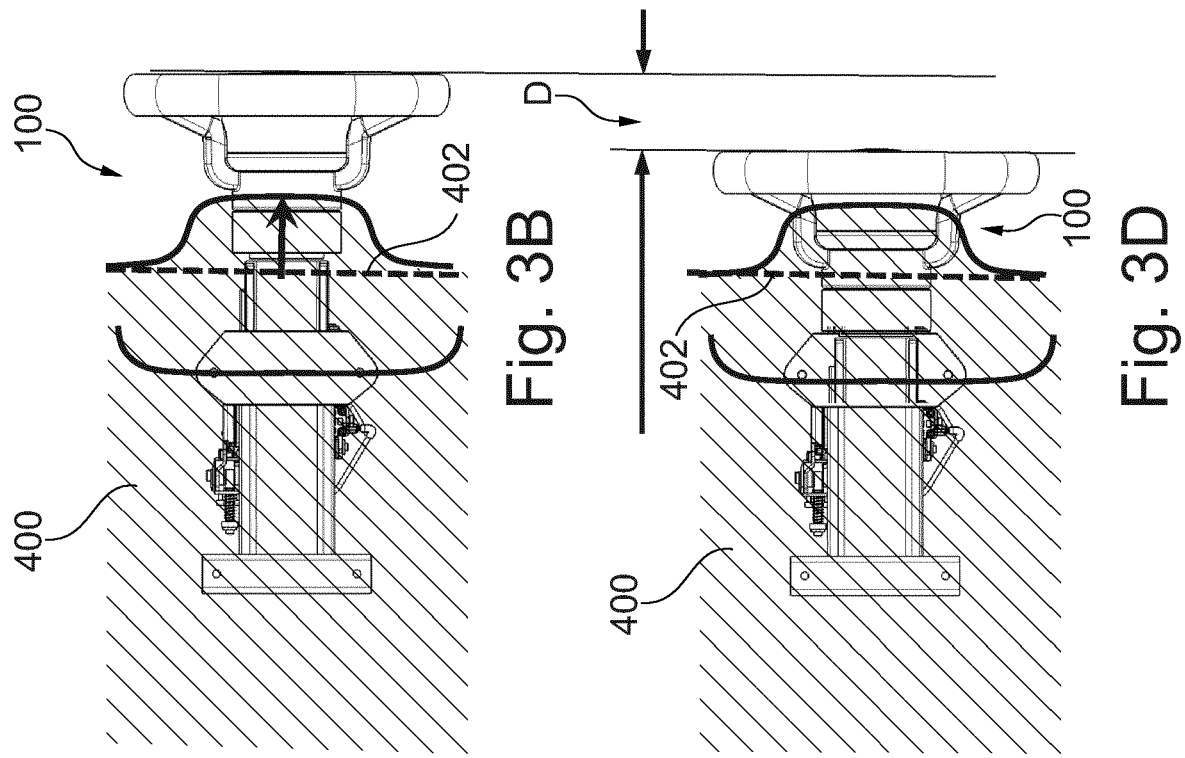
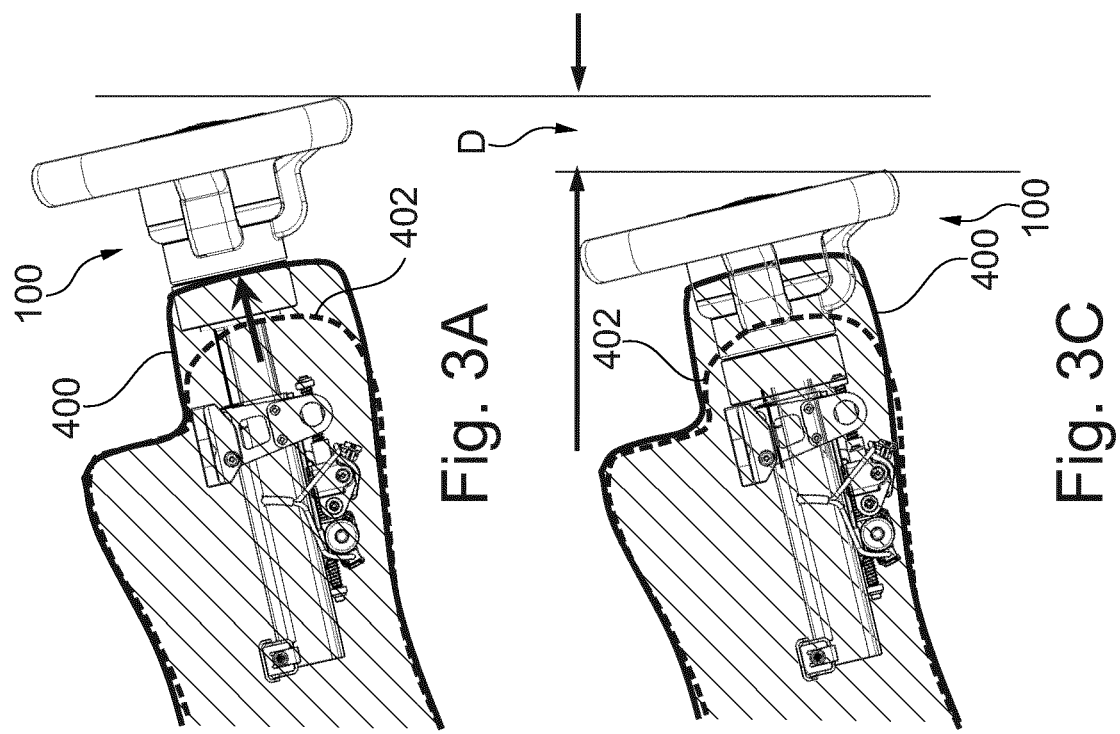

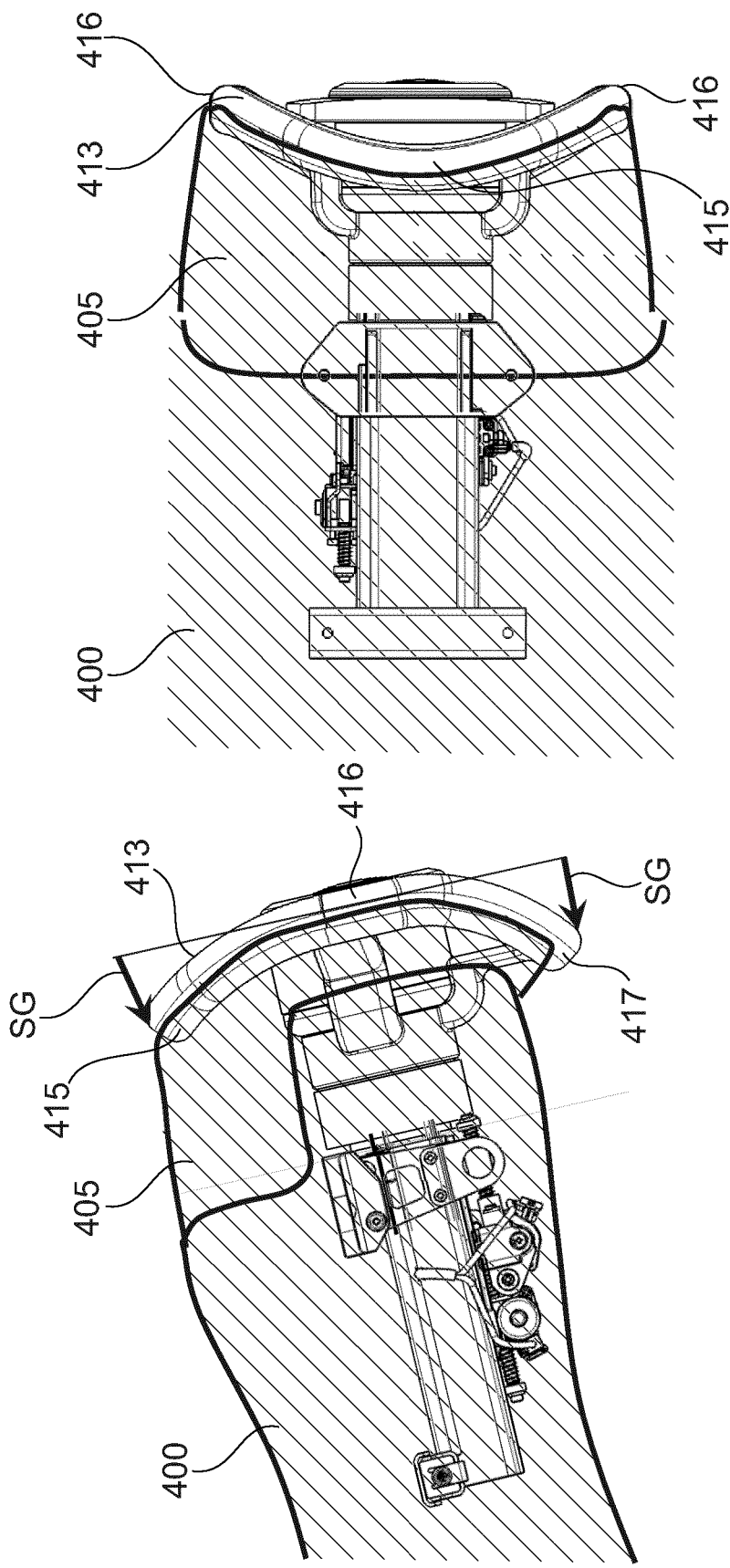

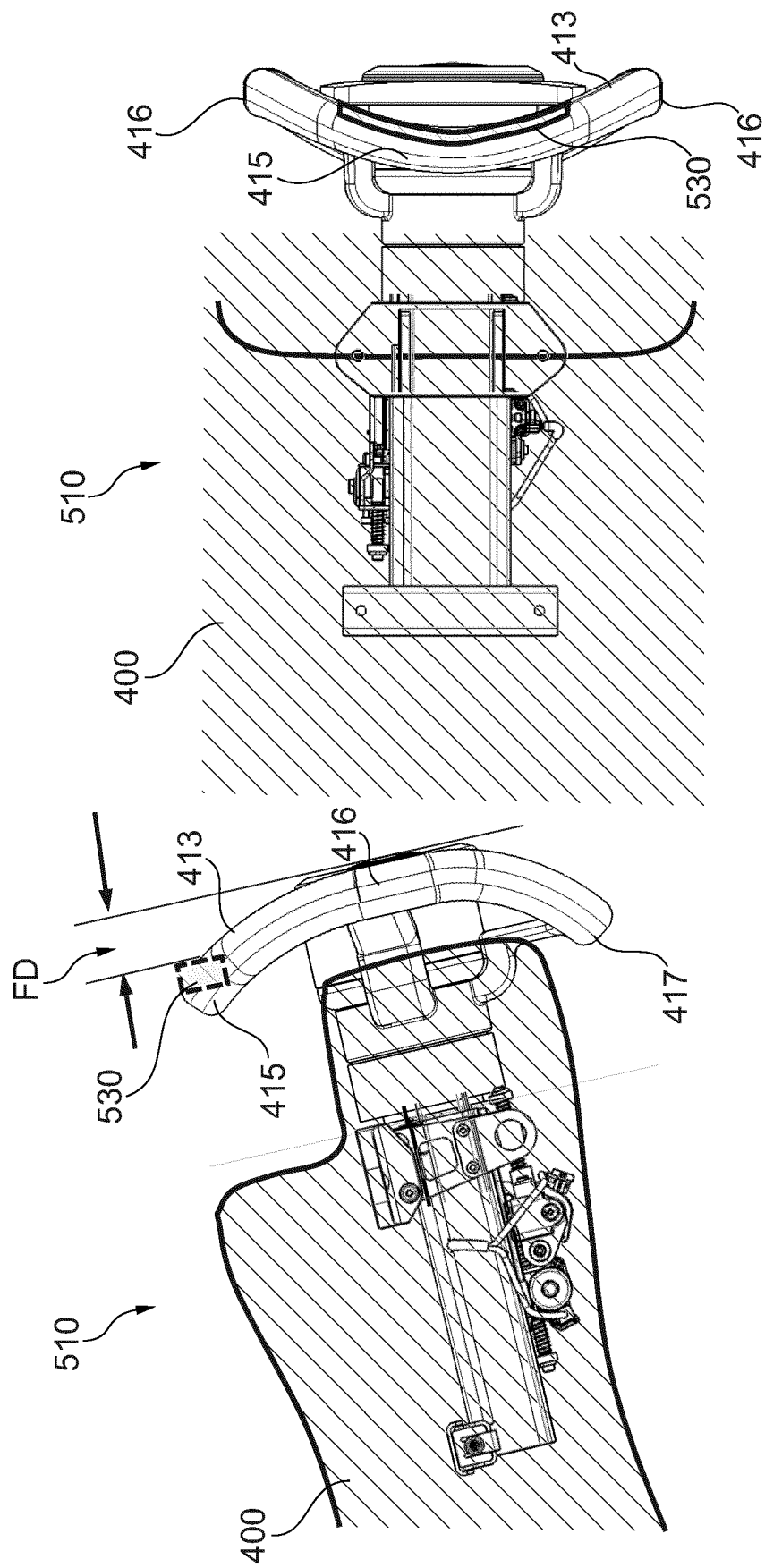

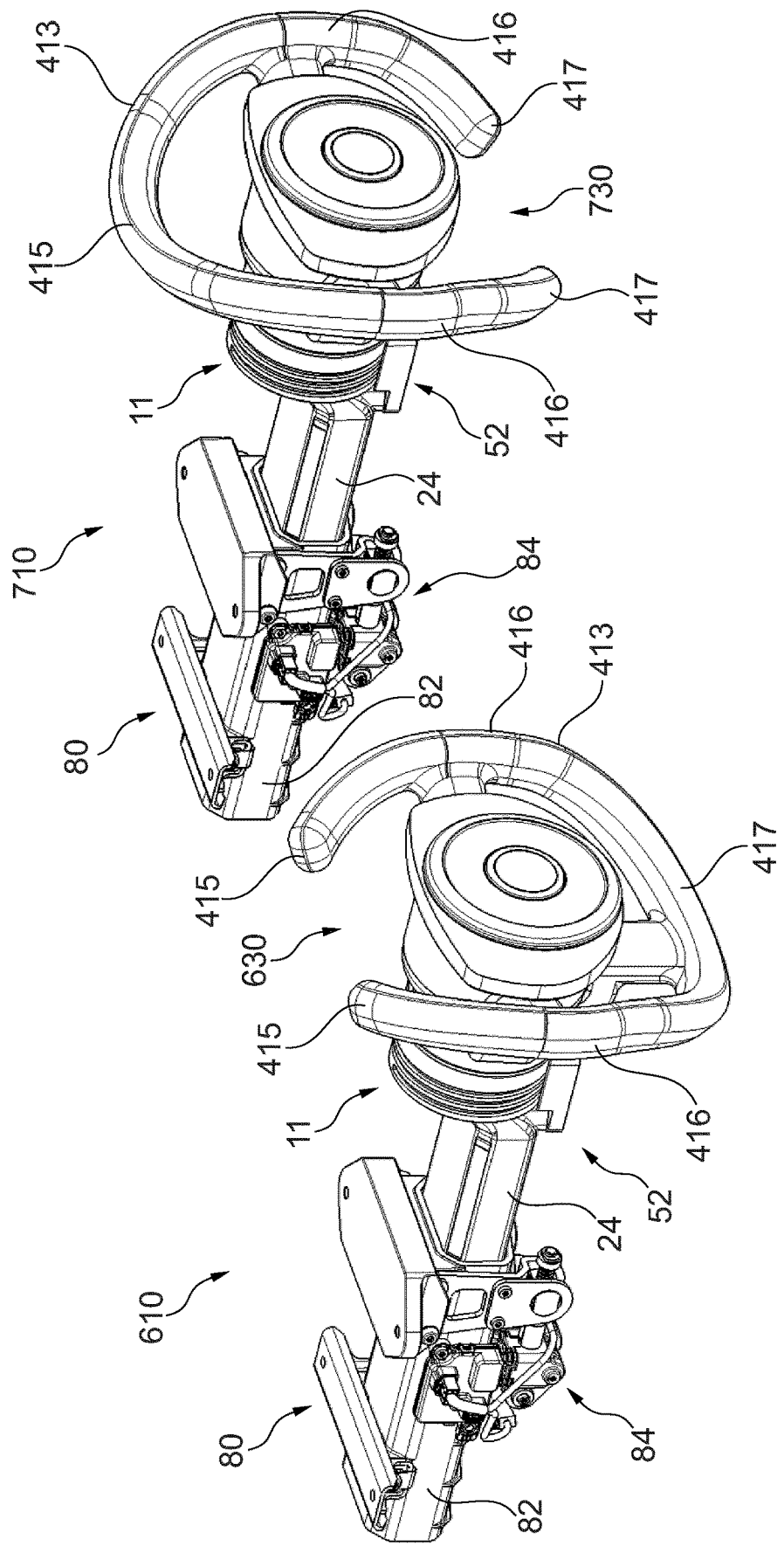

RETRACTABLE STEERING WHEEL ARRANGEMENT WITH NON-PLANAR STEERING WHEEL RIM

CROSS-REFERENCE TO RELATED APPLICATIONS

This application is the U.S. National Phase under 35 U.S.C. § 371 of International Application No. PCT/EP2021/069481, filed Jul. 13, 2021, titled RETRACTABLE STEERING WHEEL ARRANGEMENT WITH NON-PLANAR STEERING WHEEL RIM, the entirety of which is hereby expressly incorporated by reference herein.

BACKGROUND OF THE INVENTION

Field of the Invention

The present invention relates to a retractable steering wheel arrangement for a steer-by-wire steering system of a vehicle, in particular an automotive vehicle.

Description of the Related Art

In the motor vehicle and truck industry there is a continuous development towards autonomous (self-driving) and semi-autonomous vehicles. This development as well as progresses towards fully electric vehicles and autonomous vehicles further promote developments of drive-by-wire steering systems and increase the need for inventive concepts.

One specific aspect in this context relates to an adjustment of the steering wheel position during autonomous operation of the vehicle, when no steering inputs from the driver are necessary. Namely, there is an interest in temporarily relocating the vehicle for generating more interior space for other activities during the autonomous operation, such as reading, watching videos, and/or working on laptops or tablets. Several future visions known of how to adjust the steering wheel have been proposed, many of which rely on folding away the steering wheel.

However, known solutions for adjusting the position of the steering wheel are often subject to complex structures and require considerable time to transition from a driving configuration to an autonomous configuration and back. Also, known solutions may risk leading to safety issues due to adverse operability.

It is an object of the present invention to provide a steering system which has improved characteristics and overcomes at least some of the disadvantages of the prior art.

In particular, it is an object of the present invention to provide a steer-by-wire steering system having a simple configuration.

Preferably, it is an object of the present invention to provide a steer-by-wire steering system that increases driver comfort.

These objects are achieved by the subject matter of the independent claims. Preferred embodiments and preferred features are specified in the dependent claims and the following description.

SUMMARY OF THE INVENTION

The invention relates to a steering system for a vehicle, in particular for an autonomous or semiautonomous vehicle. The steering system is preferably a steer-by-wire system. The steering system comprises a steering wheel arrangement having a central axis and being reversibly retractable along the central axis in a direction towards a dashboard of the vehicle and extendable along the central axis in a direction away from the dashboard of the vehicle. Upon transition from manual driving to autonomous driving the steering wheel arrangement can be retracted towards the dashboard, and upon transition from autonomous driving to manual driving the steering wheel arrangement can be extended towards the driver.

The steering system can be configured moveable relative to a vehicle chassis and/or a vehicle dashboard, preferably at least translationally moveable, so that the steering wheel arrangement, i.e. the steering wheel and further components of the steering wheel arrangement, is reversibly retractable in a direction towards the dashboard of the vehicle and extendable in a direction away from the dashboard of the vehicle. Upon transition from manual driving to autonomous driving the steering wheel arrangement can be retracted towards the dashboard, and upon transition from autonomous driving to manual driving the steering wheel arrangement can be extended towards the driver.

The steering wheel arrangement includes a steering wheel having a steering wheel rim and at least one spoke. The steering wheel rim provides a grip portion to the vehicle driver.

The steering wheel arrangement includes a steering wheel hub fixedly connected with the steering wheel by the at least one spoke. Fixedly connected or attached can mean that the connected or attached components are not movable relative to each other, neither rotatably nor translationally. The steering wheel hub extends from the steering wheel towards the dashboard of the vehicle. The steering wheel hub and the steering wheel are rotatable together about the central axis of the steering wheel arrangement. The central axis of the steering wheel arrangement can be a central axis of the steering wheel rim and/or the steering wheel hub (common central axis).

The steering wheel rim can have a non-planar configuration. A non-planar configuration can mean that the steering wheel rim comprises several sections or portions that do not lie in a common plane, more precisely in a reference plane normal to the central axis. In other words, the non-planar steering wheel rim can have a structure with several sections or portions, wherein at least one portion or section extends in each spatial direction (at least one section in x-direction, at least one section in y-direction, at least one section in z-direction). Preferably, the non-planar steering wheel rim comprises at least two sections extending substantially in x-direction, at least two sections extending substantially in y-direction, and at least two sections extending substantially in z-direction. Preferably, the non-planar steering wheel rim comprises several sections extending substantially in x-direction, several sections extending substantially in y-direction, and several sections extending substantially in z-direction. The non-planar configuration can also be described in that the steering wheel rim comprises sections adjacent to each other that are angled or inclined relative to each other in each spatial direction In other words, non-planar can mean that at least a part of the steering wheel rim lies in or spans a first plane while at least another part of the steering wheel rim lies in or spans at least one second plane which at least one second plane intersects the first plane.

The non-planar steering wheel rim can at least partially wrap around a dashboard curvature, which can lead to interior space gain. The interior space gain can be particularly recognizable in a retracted state of the steering wheel system. The non-planar steering wheel rim can be configured fully or partially complementary to an opposing part of the dashboard. Thus, in a fully retracted state, the non-planar steering wheel rim can at least partially or fully abut to one or more sections of a corresponding dashboard part.

Further, providing a non-planar steering wheel rim can lead to increased ergonomics for the driver.

The steering wheel rim can have a total angle of rotation of less than 720°, preferably 600° or less, preferably 580° or less, more preferably 570° or less, still more preferably 550° or less. This total angle of rotation constitutes a reduction compared to known steering wheel arrangements. The steering wheel rim can even have a total angle of rotation of 450° or less, preferably 400° or less, more preferably 360° or less. A reduced total angle of rotation can reduce steering effort. Further, in combination with retractability of the steering wheel arrangement, ready availability of the steering wheel during a transition from autonomous driving to manual driving when the autonomous vehicle hands the control of the vehicle back to the driver, i.e. during transition of the steering wheel from a fully retracted state to an extended state (and reverse), can be improved. Thus, it can be ensured that the driver can securely gain back control of the steering wheel in any situation, even if the transition takes place during cornering or turning.

The rotation of the steering wheel rim about its central axis can be mechanically limited to the total angle of rotation. The rotation of the steering wheel rim about its central axis can be electrically limited to the total angle of rotation.

The steering system can comprise a steering wheel rotation limiting device for at least mechanically limiting the total angle of rotation of the steering wheel rim, i.e. the total rotation of the steering wheel hub in both circumferential directions about the axis of rotation.

The steering system can comprise a torque feedback device. The torque feedback device can be configured to provide torque feedback to a driver and/or can be configured to electrically limit the total angle of rotation of the steering wheel rim.

In an embodiment, the steering wheel system can be configured (in particular the torque feedback device can be controlled) so as to provide different total angles of rotation during manual driving and during autonomous driving. The total angle of rotation can be minimized during autonomous driving and the total angle of rotation can be maximized during manual driving. A ratio between a total angle of rotation during manual driving and a total angle of rotation during autonomous driving can be at least 3:2, preferably, at least 2:1, more preferably at least 5:2, still more preferably at least 3:1, still more preferably at least can be at least 10:3.

The steering wheel rim can be at least partially arc-shaped. The steering wheel rim can comprise at least one circular segment, more precisely at least one ring section or a fully closed ring. Preferably, the steering wheel rim is substantially, i.e. to most parts, arc-shaped. The steering wheel rim can comprise a plurality of circular segments or ring sections.

The steering wheel rim can be mirror symmetrical. In particular, the steering wheel rim can be mirror symmetrical relative to a symmetry plane which comprises the central axis of the steering wheel rim and/or steering wheel arrangement. This can further contribute to a simple regaining of steering wheel control during a transition period, even during cornering or turning situations.

The provided configuration optimally combines new and advantageous configurations with known structures which the driver is used to so as to ensure best possible driver safety.

The steering wheel rim can comprise at least one upper portion that is inclined in a direction towards the vehicle dashboard relative to a middle portion of the steering wheel rim. The steering wheel rim can comprise at least one bottom portion that is inclined in a direction towards the vehicle dashboard relative to a middle portion of the steering wheel rim. This can provide further design freedom and can further increase interior space for the occupants.

At least one portion of the steering wheel rim can be curved towards the dashboard of the vehicle. Thus, the at least one portion of the steering wheel rim is spaced further away from the driver compared to other non-curved parts of the steering wheel rim, which are arranged at comfortable hand positions for the driver. Hence, this at least one portion of the steering wheel rim can have an increased and preferably optimized focal distance, which is closer to the road focal distance compared the non-curved parts of the steering wheel rim.

The steering system can have a maximum steering ratio between 10:1 and 12:1. The steering ratio can describe the ratio between the rotation or turn of the steering wheel arrangement (in degrees), in particular the steering wheel rim, relative to the rotation or turn of the steered wheels (in degrees). Preferably, the maximum steering ratio can be between 8:1 and 10:1, more preferably between 6:1 and 8:1, still more preferably between 5:1 and 6:1. A maximum steering ratio of 5:1 means that operation of the vehicle would be possible without ever having to detach hands from the steering wheel, especially if switches and controls remain within reach from the steering wheel.

The steering system can have a variable steering ratio. In particular, the steering ratio can be adjustable from between 10:1 and 12:1 to between 5:1 and 6:1. The steering ration can be automatically adjustable during vehicle operation from between 10:1 and 12:1 to between 5:1 and 6:1 depending on certain vehicle, driving and/or environmental conditions. In other words, the steering ratio can automatically adjust (by means of a control system) during vehicle operation. Conditions on which the adjustment depends can be current vehicle speed, current centrifugal forces, traffic volume, etc. Conditions on which the adjustment depends can be a vehicle operational state relating to an autonomous driving, a manual driving or a transitional state. The steering wheel ratio can be adjustable so that a greatest steering ratio can be between 20% and 40%, preferably between 25% and 35%, more preferably 30%, higher that a lowest steering ratio.

The steering wheel arrangement can be column stalk control free. In other words, column stalk control free can mean that the steering wheel arrangement, i.e. both the steering wheel and steering wheel hub, has no column stalk controls or column-mounted stalk switches provided thereon.

The omission of column stalk controls/column-mounted stalk switches improves retractability, i.e. increases a maximum retractability of the steering wheel, as the retraction of the steering wheel is not limited by any column stalk controls/column-mounted stalk switches. This leads to space advantages within the driver cabin during autonomous driving, when the steering wheel is fully retracted.

The omission of column stalk controls/column-mounted stalk switches improves design freedom with regard to non-planar steering wheel rim structures, while contributing to safe operability. The column stalk free control free configuration of the steering wheel arrangement avoids any collision or contact between parts of the non-planar steering wheel rim (e.g. an inclined portion) and column stalk controls during rotation of the steering wheel rim. Thus, unobstructed operation of the steering wheel can be realized both during autonomous driving and during manual driving.

The absence of stalk switches allows design integration of the steering wheel in the retracted position with more space for the occupants, while at the same time allowing full steering wheel rotation because the absence of stalks eliminates the possible interferences during rotation.

The steering wheel arrangement can comprise a steering wheel center part being provided with a plurality of steering wheel controls, the steering wheel center part being non-rotatable about the central axis. The steering wheel center part can include an airbag module arranged inside the steering wheel center part. The steering wheel center part can be fixedly connected with a steering system support column or a stator so as to be non-rotatable about the central axis. By this configuration, the steering wheel center part stays stationary regarding its rotational orientation even in a condition in which the steering wheel is rotated. The steering wheel center part can be completely rotationally stationary (i.e. non-rotatable). Thus, regardless of the rotational orientation of the steering wheel, controls and if applicable signs, displays, etc. provided on the center part are always kept in the same rotational orientation so as to be readily available to the driver and thus allow a simple, intuitive and thus safe operation of the controls in any situation.

The steering wheel center part can comprise a steering wheel center pad. More precisely, a component of the steering wheel center part, which faces the driver of the vehicle/faces away from the dashboard of the vehicle, can be formed as a steering wheel center pad. The steering wheel center part can be arranged coaxial to the steering wheel hub and to the steering wheel.

Even in embodiments, in which the steering system has a maximized retractability and thus a maximum retraction travel is increased, safe operability of the system can be improved by ensuring that the center part including the airbag module is rotationally stationary and does not change its rotational orientation. Even during a transition from autonomous driving to manual driving when the autonomous vehicle hands the control of the vehicle back to the driver, i.e. during transition of the steering wheel from a fully retracted state to an extended state (and reverse), the center part is rotationally stationary. Thus, ready availability of the steering wheel controls to the driver can be ensured.

Moreover, by ensuring that the center part including the airbag module is rotationally stationary and does not change its rotational orientation, effective and proper deployment of the airbag can be achieved. Thus, a steering wheel-mounted airbag can be provided and there is no need to relocate the driver-side airbag to unconventional positions, in which the airbag's effectiveness is unknown.

This can assure continuous availability of all controls to the driver in an intuitive manner, and assures proper deployment of the airbag, regardless of whether the steering wheel is in the manual driving position, a retracted autonomous driving position, or an intermediate transition position. This can promote acceptability and increase safety of autonomous vehicles as especially the transition from manual driving to autonomous driving, and reverse, constitute key situations, relevant for the driver.

In an embodiment, an orientation of the center part, in particular of the center pad, can be adjustable. To this, the center part can be pivotably supported inside the steering system support column so as to be pivotable about an axis traverse to the central axis. The center part can be attached to the steering system support column or the stator by a joint or hinge arrangement. Hence, while being non-rotatable (rotationally stationary) relative to the central axis, the center part can be pivotable, preferably up and down. Thus, the pivotable orientation (or up and down orientation) of the center part can be adjusted depending on or in accordance with the retraction/extension position of the steering wheel arrangement in order to keep the deployment direction of the airbag module and the steering wheel controls oriented towards the driver. The orientation of the center part, in particular of the center pad, can be automatically adjustable. The orientation of the center part, in particular of the center pad, can be passively or actively adjustable. Passively adjustable can mean that the movement/pivoting of the center part is caused by an actuator that moves the steering system support column relative to the vehicle body. Actively adjustable can mean that the movement/pivoting of the center part is caused by an additional actuator that actively moves the center part mechanically independent of the movement of the steering system support column relative to the vehicle body.

The steering wheel controls can include at least one or a plurality of the following controls: turn signal control/s, light control/s, horn control/s, driver aid control/s, infotainment control/s, wiper control/s and/or cruise control/s. In particular, controls that are provided in the form of column stalk controls in conventional steering wheel assemblies can be provided as steering wheel controls on the steering wheel center part, namely on the steering wheel center pad.

The steering wheel controls can have different technical configurations depending on their respective function. Individual or all of the steering wheel controls can be formed as single click push buttons, multiple click push buttons, touch sensitive buttons, analogous rotary buttons, digital rotary buttons, monostable levers and/or multi-stable levers. The push buttons can be pressure force sensitive push buttons. For digital buttons, such as digital rotary buttons, the position of the button can be reset at key-on. Levers provided on the steering wheel center part can have a pivot axis at any position in space.

In an embodiment, at least one additional control and/or at least one display unit can be arranged on the steering wheel, preferably on the at least one spoke. In this case, controls (and display) can be provided both on the non-rotating and on the rotating part of the steering wheel.

Preferably, none of the controls are configured as column stalk switches and none of the controls are arranged on a circumferential surface of the steering wheel hub. Preferably, all controls of the steering system are provided on a side of the steering system facing towards the driver, i.e. facing away from the dashboard of the vehicle. Preferably, no controls are arranged on the steering wheel arrangement between the steering wheel and the dashboard of the vehicle.

The torque feedback device can include an electric machine having a rotor and a stator. The rotor can be attached to the steering wheel hub and can be rotatable together with the steering wheel hub (and the steering wheel) about the central axis.

The stator can be fixedly attached to a steering system support column, preferably to a section of the column that extends along the central axis, wherein the steering system support column is non-rotatable about the central axis. In other words, the steering system support column can be rotationally stationary or rotationally fixed, i.e. can be non-rotatable about any longitudinal axis.

According to an embodiment, the steering wheel rim can be provided with at least one display unit mounted on the steering wheel rim. In particular, the non-planar structure of the steering wheel rim can provide sections that are suitable for display unit arrangement. Preferably, the steering wheel rim can be provided with at least two display units. A plurality of display units allows displaying different information on different display units. The at least one display unit can be a touch screen. In this case, controls can be realized by the at least one display unit.

The at least one display unit can be provided in an area of a front surface facing the driver, in particular in the at least one portion of the steering wheel rim that is inclined or curved towards the dashboard of the vehicle.

In particular, the at least one display unit can be arranged on the inclined upper portion or the inclined bottom portion of the steering wheel rim. Mounting the at least one display unit on a portion inclined in a direction towards the dashboard, i.e. away from the driver, can increase the focal distance. This can contribute to optimal perceptibility of the at least one display unit, more precisely of the information and/or control displayed by the at least one display unit. Consequently, this can further increase overall passenger and driving safety.

The at least one display unit can have the shape of a circular segment. By this structural configuration, the at least one display unit can optimally integrated in an at least partially circular/ring shaped steering wheel rim.

In an embodiment, the steering wheel rim can be provided with an open top portion and/or an open bottom portion. The steering wheel rim can in these cases be configured in form of one or two open ring segment/s.

According to an embodiment, a rear surface of the steering wheel, preferably that faces the dashboard of the vehicle can be formed at least partially complementary to a dashboard front surface facing the rear surface of the steering wheel. Such a configuration can further contribute to increasing the maximum retractability of the steering wheel arrangement and can contribute to a harmonious design of the driver's cabin. Preferably, the rear surface can be formed such that in a completely retracted state of the steering wheel arrangement, at least 40% of the rear surface of the steering wheel abuts the dashboard front surface, preferably at least 50%, more preferably at least 60%, still more preferably at least 70%.

According to an embodiment, the steering system is axially moveable (and translationally movable) along the central axis so that the steering wheel arrangement is reversibly retractable in a direction towards the dashboard and extendable in a direction away from the dashboard of the vehicle. This constitutes a particularly simple configuration for enabling controlled and quick retractability of the steering system.

The steering wheel arrangement can have a retraction travel (and thus also a respective extension travel) between 50 mm and 150 mm, preferably between 60 mm and 120 mm, more preferably between 80 mm and 100 mm. Thus, the steering system is optimally adjustable to different drivers and can provide adequate space inside the driver's cabin during autonomous driving.

The retraction travel can be a travel in addition to an adjustment travel for adjusting the vehicle position. The adjustment travel can be between 50 and 70 mm. Thus, a total axial travel can be between 100 mm and 220 mm. The total travel can even be 300 mm.

In an embodiment, the airbag module, more precisely an airbag module central axis, can be located offset from the central axis of the steering wheel arrangement. Alternatively, the airbag module, more precisely the airbag module central axis, is arranged coaxial to the central axis of the steering wheel arrangement or matches the central axis of the steering wheel arrangement.

The airbag module can be arranged on or partially inside the steering wheel center part in such a way that an airbag module central axis is non-parallel to the central axis of the steering wheel arrangement. Alternatively, the airbag module, more precisely the airbag module central axis, is arranged parallel to the central axis of the steering wheel arrangement.

The position and orientation of the airbag module can be selected based on the size and shape of the other steering wheel components, such as the steering wheel rim, or based on the overall configuration of the steering wheel, in order to ensure proper deployment of the airbag.

According to an embodiment, the rotor can be an outer rotor and the stator can be an inner stator. Accordingly, in this embodiment the steering wheel hub is fixedly attached to an outer rotor, wherein the steering wheel rim is fixedly connected with the steering wheel hub via the at least one spoke. The steering wheel rim and the at least one spoke can be formed integrally. The at least one spoke and the steering wheel hub can be formed integrally. The steering system can comprise a steering system support column connected with the steering wheel arrangement.

In an embodiment, the steering system support column can form an inner member of a tubular telescope arrangement, wherein the inner member is translationally movable, non-rotatable and non-pivotable relative to an outer member of the tubular telescope arrangement. In particular, the tubular telescope arrangement can be a two, three or multiple piece telescope arrangement, i.e. a telescope arrangement having at least two segments or members, namely one outer segment or member and one inner segment or member. The telescope arrangement provides a simple and stiff configuration. Preferably, the tubular telescope arrangement can be a three piece telescope arrangement, i.e. a telescope arrangement having three segments or members, namely one outer segment or member, one intermediate segment or member, and one inner segment or member (which can be the steering system support column). The steering system support column can be formed by two or more fixedly connected members.

The translational movement, i.e. the sliding, of the inner member relative to the outer member of the tubular telescope arrangement can be caused by an actuator in form of an electric motor that is configured to act upon the inner member.

Preferably, the outer member of the tubular telescope arrangement can be a vehicle support column via which the steering system support column is attached to a vehicle body. The vehicle support column—and with the vehicle support column the steering wheel support column and the steering wheel arrangement attached thereto—can be adjustable relative to the vehicle body by being pivotable and/or radially displaceable relative to the vehicle body. Thus, the steering wheel arrangement is individually adjustable to different drivers.

According to an embodiment, the steering wheel rim can comprise at least one sensor, preferably a plurality of sensors, configured to detect contact of a driver's hand/fingers with the steering wheel. The steering system (or more precisely a control system of the steering system) can be configured to automatically stop retraction of the steering wheel arrangement when the retraction travel reaches a predetermined threshold value (e.g. a predefined minimal distance between the steering wheel and the dashboard) and when at the same time the at least one sensor detects that the driver's hand/fingers contacts the steering wheel. Thus, jamming of the fingers due to steering wheel retraction can be securely prevented.

According to an embodiment, the steering wheel rim can comprise at least one sensor, preferably a plurality of sensors, configured to detect contact of a driver's hand/fingers with the steering wheel. The at least one sensor can be configured to detect a predefined minimum contact of the driver's hand and/or fingers with the steering wheel that needs to be reached before the steering system (or more precisely a control system of the steering system) initiates or allows transition from autonomous driving to manual driving. Thus, it can be ensured that the driver is ready and willing to regain control of the vehicle steering. This further contributes to driver safety.

The sensor/sensors for detecting contact of a driver's hand/fingers with the steering wheel in order to prevent jamming of the driver's fingers can be the same or different sensor/sensors as/than the sensor/sensors for detecting contact of a driver's hand/fingers with the steering wheel in order to initiate or allow the transition from autonomous to manual driving.

According to an embodiment, the steering system support column can include an off-axis section having a first longitudinal axis that is off-set, and preferably parallel, to the central axis of the steering wheel arrangement and can include an aligned section having a second longitudinal axis that corresponds to the central axis of the steering wheel arrangement. Corresponding to the central axis of the steering wheel arrangement can also be described as being aligned with or coaxial to the axis of rotation. The off-axis section and the aligned section can be formed by separate but fixedly connected components. The off-axis section and the aligned section can be fixedly connected by a connection portion. The connection portion can be a further separate component or can be formed integrally with the off-axis section or the aligned section. The steering wheel hub can be rotatably mounted on the aligned section and thus can at least partially overlap the aligned section in an axial direction. The off-axis section can be axially spaced from the steering wheel hub.

The stator of the torque feedback device can be non-rotatably fixed to the aligned section of the steering system support column.

Preferably, the aligned section can form a hub element that is stationary relative to the rotor and the steering wheel hub and that carries the inner stator of an outer rotor electric machine.

This structural design of the steering system support column including an off-axis section and an aligned axis section in combination with the torque feedback device arranged on the aligned section provides optimized use of installation space, while allowing a simple retractability of the steering wheel arrangement and at the same time reducing friction and inertia due to the torque generation/transmission.

Thus, the combination of the described steering system support column design and the torque feedback device contributes to a structurally optimized configuration.

The connection portion can extend transversally to both the first longitudinal axis and the second longitudinal axis.

The off-axis section, the aligned section and/or the connection portion can be tubular. In particular, each of the off-axis section, the aligned section and the connection portion can be tubular.

The off-axis section, the aligned section and/or the connection portion can at least partially have a substantially rectangular or circular cross-section. Alternatively, the off-axis section, the aligned section and/or the connection portion can have any other cross-sectional shape. For example, the off-axis section, the aligned section and/or the connection portion can have an oval or polygon shaped cross-section. A polygon shaped cross-section can be advantageous in view of providing some flat surfaces to provide angular reference between an axially sliding part and a fixed part of a telescope arrangement, so as to prevent rotation with respect to each other around a first longitudinal axis. The shape of the cross-section of the off-axis section, the aligned section and the connection portion can be the same or can be different.

According to an embodiment, the steering system support column can comprise an opening, preferably arranged in the off-axis section or in the connection portion, which provides access to electric machine phase connections and/or steering wheel sensor connections which connect the electric machine and/or at least one sensor with the electronic control unit. The sensor can be the steering wheel angle sensor. Thus, a steering wheel rotation limiting device, in particular a removably attached steering wheel rotation limiting device, can enable accessibility to electrical connections for service and maintenance purposes and can at the same time securely protect the electrical connection and components from damaging environmental influences.

According to an embodiment, the steering system can comprise an electronic control unit at least for controlling the torque feedback device and/or for receiving and transmitting sensor information, such as information from the steering wheel angle sensor. The electronic control unit can be arranged inside the off-axis section of the steering system support column, preferably in an area adjacent to or following the connection portion. In this case, the electronic control unit can be arranged close to the stator windings of the torque feedback electric machine and/or close to sensor/s, such as the rotation angle sensor for measuring rotation of the electric machine rotor.

The steering wheel center part including the airbag module can be arranged at least partially inside and/or can be formed of the aligned section of the steering system support column and thus inside the stator of the torque feedback electric machine.

In an embodiment, the steering system can comprise additional auxiliary components which are arranged inside the aligned section of the steering system support column and thus inside the stator of the torque feedback electric machine. The additional auxiliary components can comprise switchgear controls, a driver display arrangement, and/or a wiring harness. By arranging the auxiliary components inside the steering system support column, installation space can be efficiently used, i.e. required overall installation space for the steering system can be reduced.

According to an embodiment, the aligned section of the steering system support column can be provided with a protruding flange portion that provides a first bearing surface for a first bearing arrangement arranged between the steering system support column and the steering wheel hub. Preferably, the protruding flange portion can be arranged in a transition region between the aligned section and the connection portion, i.e. an end portion of the aligned section facing away from a steering wheel connected or connectable with the steering system.

The protruding flange portion provides a circular ring-shaped first bearing surface. By means of the protruding flange portion, the outer diameter of the main part of the aligned section can minimized, while still supporting the steering wheel hub having a substantially greater inner diameter.

The aligned section of the steering system support column can comprises a circular ring-shaped portion that provides a circular ring-shaped second bearing surface for a second bearing arrangement arranged between the steering system support column and the steering wheel hub. Preferably, the circular ring-shaped portion can be arranged at least in a region following or adjacent to the steering wheel connected or connectable with the steering system, in other words at least in a region facing away from the off-axis section and the connection portion. By means of the circular ring-shaped portion, the outer shape/contour of the main part of the aligned section can be freely chosen, while still rotatably supporting the steering wheel.

The first and the second bearing arrangement can realize rotatable support of the steering wheel hub and a steering wheel connected therewith on the steering system support column.

The steering wheel rotation limiting device can be attached to the off-axis section via a base of the steering wheel rotation limiting device and can engage the steering wheel hub via a sliding element.

The base of the steering wheel rotation limiting device comprises two axially opposing end stop surfaces, and the sliding element is axially slidable parallel to the axis of rotation relative to the base and relative to the steering wheel hub between the two opposing end stop surfaces. The sliding element can comprise a projection, in particular a spiral ridge, that engages a spiral groove formed on an outer circumferential surface of the steering wheel hub so that rotation of the steering wheel hub causes axial movement of the sliding element, and so that abutment of the sliding element with one of the two end stop surfaces blocks further movement of the sliding element and thus further rotation of the steering wheel hub.

The base of the steering wheel rotation limiting device can overlap the protruding flange portion, and thus the first bearing surface, in an axial direction with respect to the axis of rotation. Thus, an advantageous compact design of the steering system structure can be realized.

The base can comprise a compartment formed therein that accommodates the sliding element and thereby inhibits radial movement of the sliding element in a direction away from the steering wheel hub and lateral movement of the sliding element transversal to a direction of its axial displaceability. The compartment can only allow axial movement of the sliding element between the two opposing end stop surfaces.

The base can be arranged radially adjacent to the steering wheel hub such that the base and the outer circumferential surface of the steering wheel hub completely enclose the compartment.

The steering system can be configured so that in a condition or position in which the sliding element abuts one of the two opposing end stop surfaces, the projection is still spaced from both end portions of the spiral groove, preferably by a defined distance or a defined section of the spiral groove. Hence, restriction of rotation of the steering wheel hub is not caused by an interaction of a portion of the projection with an end portion of the spiral groove, but instead by an abutment of a surface of the sliding element with one of the two end stop surfaces. Thus, the abutting surface area can be increased, compared to known solutions, which prevents damage of the steering system, in particular of the spiral groove and the projection, even under influence of strong external forces.

In an embodiment, the torque feedback device can be configured to increase the torque feedback level when a minimum distance between the sliding element and one of the two end stop surfaces falls below a predetermined threshold value. In this case, rotation of the steering wheel hub/steering wheel can be decelerated to some extend before abutment of the sliding element with one of the two end stop surfaces completely and abruptly blocks further rotation of the steering wheel hub/steering wheel. A threshold can be defined with respect to each of the two end stop surfaces.

The steering wheel can be directly or indirectly mechanically attached to the steering wheel hub by fixing elements. For example, the fixing elements can comprise bolts, screws, rivets, nuts, bonding and/or swaging (pressing and/or deforming). Preferably, a total number of three to ten screws can be arranged in equal distances around an axis of rotation of the steering wheel and steering wheel hub.

With respect to the central axis of the steering wheel arrangement, the fixing elements can be arranged at different radial positions, i.e. radial heights, than the stator windings. In other words, the fixing elements can be arranged at different radial heights compared to the stator windings when viewed with regard to the central axis of the steering wheel arrangement, i.e. the fixing elements can have different radial distances central axis of the steering wheel arrangement than the stator windings.

Providing an outer rotor electric machine for the torque feedback device and arranging the fixing elements at different radial positions than the stator windings allows for an advantageous compact design of the steer-by-wire steering system that reduces the required installation space.

A portion of the fixing elements can axially overlap a portion of the stator windings with respect to the central axis of the steering wheel arrangement. In particular, a portion of each of the fixing elements or a portion of only one or particular fixing elements can axially overlap a portion of the stator windings with respect to the central axis of the steering wheel arrangement. Such an arrangement is possible by means of the arrangement of the fixing elements at different radial positions than the stator windings. Thus, at least portions of the fixing elements can be arranged parallel to the stator windings, which further contributes to a compact structure of the steering system.

With respect to the central axis of the steering wheel arrangement, the fixing elements can be arranged at different radial positions than the first bearing arrangement; and/or the fixing elements can be arranged at different radial positions than the second bearing arrangement. Such arrangements can also enable an overlapping/parallel arrangement of components of the steering system, which further contributes to a compact design and reduced installation space requirements of the steering system Another aspect relates to an arrangement comprising a steering system of the type described above and a dashboard for a vehicle.

A front surface of the dashboard can be formed at least partially complementary to a rear surface of the steering wheel. Thus, opposing surfaces of the dashboard and of the steering wheel can be formed at least partially complementary. Such a configuration can further contribute to increasing the maximum retractability of the steering wheel arrangement and can contribute to a harmonious design of the driver's cabin.

In an embodiment, the steering wheel hub can be at least partially or completely retractable into a corresponding recess formed in the dashboard.

Even though some of the features, functions, embodiments, technical effects and advantages have been described with regard to one aspect, it will be understood that these features, functions, embodiments, technical effects and advantages can be combined with one another also applying to other embodiments and aspects.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings:

FIGS. 1A to 1C show schematic front, side and top views of a steering system according to an embodiment of the invention.

FIGS. 2A and 2B show the front view of FIG. 1A in more detail and with different rotational orientations.

FIGS. 3A to 3D show schematic side and top views of the steering system of FIGS. 1A to 1C together with a dashboard design.

FIGS. 6A and 6B show schematic side and top views of the steering system of FIG. 5 together with a dashboard design.

FIGS. 7A to 7C show schematic views of the steering system according to another embodiment of the invention.

FIG. 8 shows a schematic perspective view of the steering system according to another embodiment of the invention.

FIG. 9 shows a schematic perspective view of the steering system according to another embodiment of the invention.

DETAILED DESCRIPTION

Figure 4B:
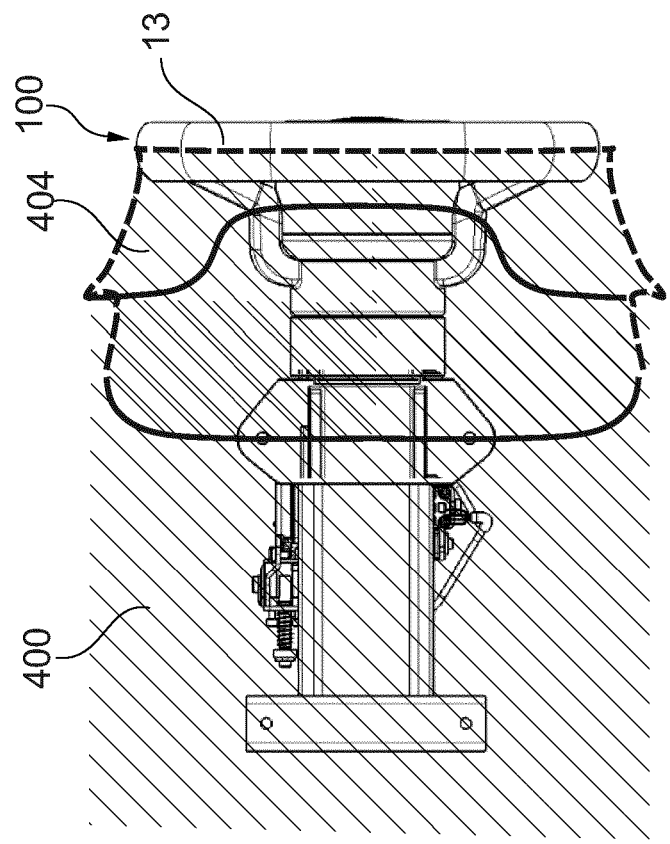
FIGS. 4A and 4B show schematic side and top views of the steering system of FIGS. 1A to 1C together with another dashboard design.

Various examples of embodiments of the present invention will be explained in more detail by virtue of the following embodiments illustrated in the figures and/or described below. Some of the figures are meant to show specific details of the invention and thus focus on particular aspects of the invention. However, details shown in embodiments of certain figures can also be implemented into the embodiments of other figures. Like features are provided with like reference signs.

FIGS. 1A to 1C show schematic views of a steering system 10 for an autonomous road vehicle according to an embodiment of the invention. As can be seen in FIGS. 1A to 1C, the steering system 10 is a steer-by-wire steering system that has no direct mechanical connection for transferring a driver's steering commands from a steering wheel 12 of the steering system 10 to the wheels (not shown) of the vehicle. Instead, the mechanical connections are replaced by an electro-mechanical arrangement.

The steering system 10 comprises a steering wheel arrangement 11 with the steering wheel 12 and steering wheel hub 14 mechanically connected with the steering wheel 12. The steering wheel hub 14 and the steering wheel 12 are non-rotatable relative to each other, but can be rotated together about a central axis A of the steering wheel arrangement 11. As can be seen, steering wheel 12 comprises a ring-shaped rim 13 and, in the shown embodiment, three spokes 15 that connect the steering wheel rim 13 with the steering wheel hub 14.

The steering wheel arrangement 11 further includes a torque feedback device for generating torque feedback to the driver. The torque feedback device is housed inside the steering wheel hub 14 and is thus not shown in FIG. 1A to 1C (but shown and denoted with reference sign 44 in FIG. 11A).

The steering wheel arrangement 11 comprises a steering wheel center part 100 (shown in more detail in and described in connection with FIGS. 2A and 2B). The steering wheel center part 100 is rotationally stationary and is non-rotatably fixed to an end portion of the steering support column 24. The steering wheel center part 100 includes an airbag module integrated and housed therein, wherein the airbag module is configured to deploy the airbag, in case of a crash, in a direction towards the driver.

The steering system 10 further comprises a steering system support column 24 that is configured to support the steering wheel arrangement 11. The steering system support column 24 can connect the steering wheel arrangement 11 with the chassis of the vehicle. In the shown embodiment, the steering system support column 24 is a tubular member. The steering system support column 24 forms an inner member of a tubular telescope arrangement 80 and is translationally movable relative to a vehicle support column 82 which forms an outer member of the tubular telescope arrangement 80. Consequently, the steering system support column 24 and the steering wheel arrangement 11 supported thereon is translationally displaceable with respect to the central axis A independent of the vehicle support column 82, in order to enable retractability and extendability of the steering wheel arrangement 11. The vehicle support column 82 connects the steering system support column 24 to the vehicle body (not shown) i.e. by adjustment elements 84 (brackets, axial adjustment elements and vertical adjustment elements). Thus, the steering system support column 24 and all components supported thereon are radially displaceable/pivotable relative to the vehicle body dependent on the vehicle support column 82, i.e. the adjustability/displaceability of the vehicle support column 82.

As can be seen in FIGS. 1B and 1C, the steering wheel arrangement 11 is completely column stalk control free. In other words, the steering wheel arrangement 11 has no column stalk switches or levers arranged thereon. More precisely, the steering wheel hub 14 is completely column stalk control free. Thus, the steering system 10 has no column stalk controls that could block or limit retractability of the steering wheel arrangement 11. In the present embodiment, conventional column stalk controls are replaced by steering wheel controls (see FIGS. 2A and 2B) arranged on the steering wheel center part 100, more precisely on a surface of a steering wheel center pad 102 facing the driver.

In the steering system, no controls are arranged between a rear surface of the steering wheel 12 and a front surface of the dashboard (this relates to controls of the steering wheel, however, controls can be provided on the front surface of the dashboard or other vehicle cabin components).

FIGS. 2A and 2B show the front view of the steering wheel arrangement 11 in more detail and with different rotational orientations. More precisely, the steering wheel 12 has different rotational orientations in FIGS. 2A and 2B. In FIG. 2A the steering wheel 12 is in a basic position in which the steering wheel 12 has not been rotated. This basic position constitutes a position in which the wheels of the vehicle are straight, i.e. have not been turned. FIG. 2B shows the steering wheel 12 in a certain rotated position in which the steering wheel 12 has been rotated about the central axis A in order to turn the wheels of the vehicle. Arrow R shows the rotation direction of the steering wheel 12.

As can be seen in FIG. 2B, the center part 100 of the steering wheel arrangement 11 is rotationally stationary, i.e. is non-rotatable about the central axis A. Even if the steering wheel 12 is rotated, the center part 100 stays in its basic, non-rotated orientation. Therefore, regardless of a current driving situation and a current rotational orientation of the steering wheel 12, the controls arranged on the center part 100 are readily available of to the driver. This applies even for a transition phase from autonomous driving to manual driving when the autonomous vehicle hands the control of the vehicle back to the driver, which increases safety of autonomous vehicles.

The center part 100, more precisely the center pad 102, is provided with a plurality of steering wheel controls 104A to 110B. The steering wheel controls 104A to 110B comprise turn and light signal controls 104A and 104B arranged on left and right side flanges of the center pad 102. The turn and light signal controls 104A and 104B replace conventional turn and light signal column stalk control levers. The center pad 102 is further provided with driver aid and cruise controls 106 and wiper controls 108. Further, a horn control is provided on the center pad 102. In the shown embodiment, two alternative horn control positions 110A and 110B are shown.

Besides the steering wheel controls 104A to 110B arranged on the center pad 102 of the center part 100, additional controls are provided on spokes 15 of the steering wheel 12. In the present embodiment, further driver aid controls 300 and infotainment controls 302 are provided on the spokes 15.

Moreover, controls can also be arranged on the steering wheel rim 13. In the shown embodiment, alternative horn control positions 210A and 210B are shown.

The steering wheel controls 104A to 110B as well as the additional controls 210A, 210B, 300, 302 can have different technical configurations depending on their respective function. Individual or all of the controls can be formed as single click push buttons, multiple click push buttons, touch sensitive buttons, analogous rotary buttons, digital rotary buttons, monostable levers and/or multi-stable levers. The push buttons can be pressure force sensitive push buttons. For digital buttons, such as digital rotary buttons, the position of the button can be reset at key-on. Levers provided on the steering wheel center part can have a pivot axis at any position in space.

FIGS. 3A to 3D show the steering system 10 in retracted positions (FIGS. 3C and 3D) and in extended positions (FIGS. 3A and 3B). Further, the contour of a dashboard of the vehicle is schematically indicated by line 400. The contour of the dashboard is shown in comparison to a conventional dashboard design contour indicated by dashed line 402. The omission of column stalk levers in the present steering wheel arrangement 11 allows new dashboard design options. For example, as shown in FIGS. 3A to 3D, an extension of the dashboard 400 can be increased in direction towards the driver/in direction towards the steering wheel 12—compared to conventional dashboards—while providing the same maximum steering arrangement travel D (retraction travel/extension travel) as a conventional steering system with column stalk levers. In conventional steering systems with column stalk levers, the maximum steering arrangement travel D can be limited due to an abutment of the column stalk levers with the dashboard. Thus, the dashboard extension towards the driver needs to be reduced in order to allow the shown maximum steering arrangement travel D. With the steering system of the shown embodiment, such a limitation has been removed so that the dashboard extension can be increased. This can allow for an optimized dashboard design, e.g. with regard to knee airbag implementation.

Figure 4A:
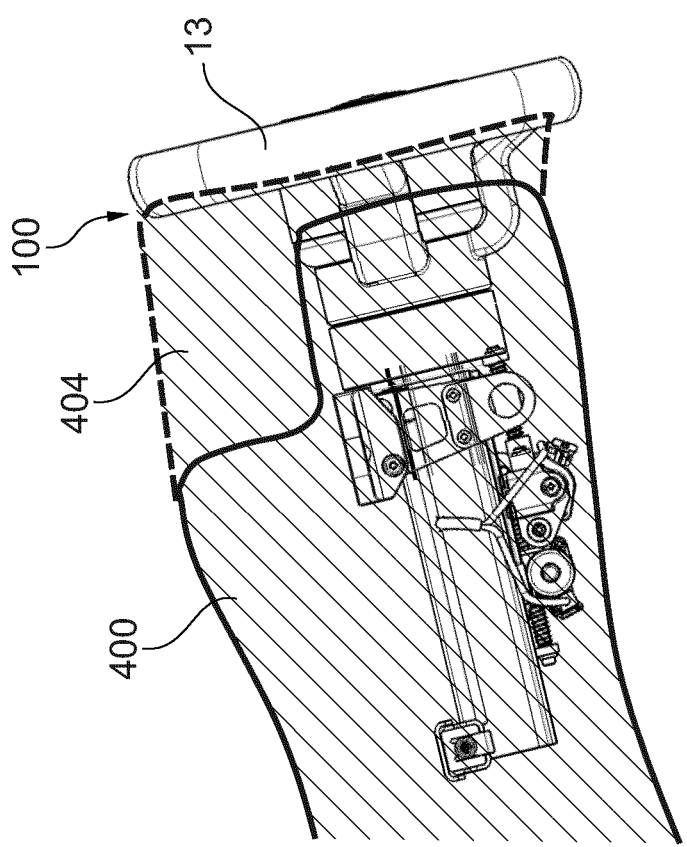

FIGS. 4A and 4B show the steering system 10 in retracted positions together with an alternative dashboard design. The alternative dashboard design further includes an additional extension part 404 so that in a retracted state of the steering wheel arrangement 11, the dashboard and the steering wheel 12 at least partially abut. Preferably, the dashboard and the steering wheel 12 can be formed at least partially complementary so as to allow optimal abutment.

Figure 5:
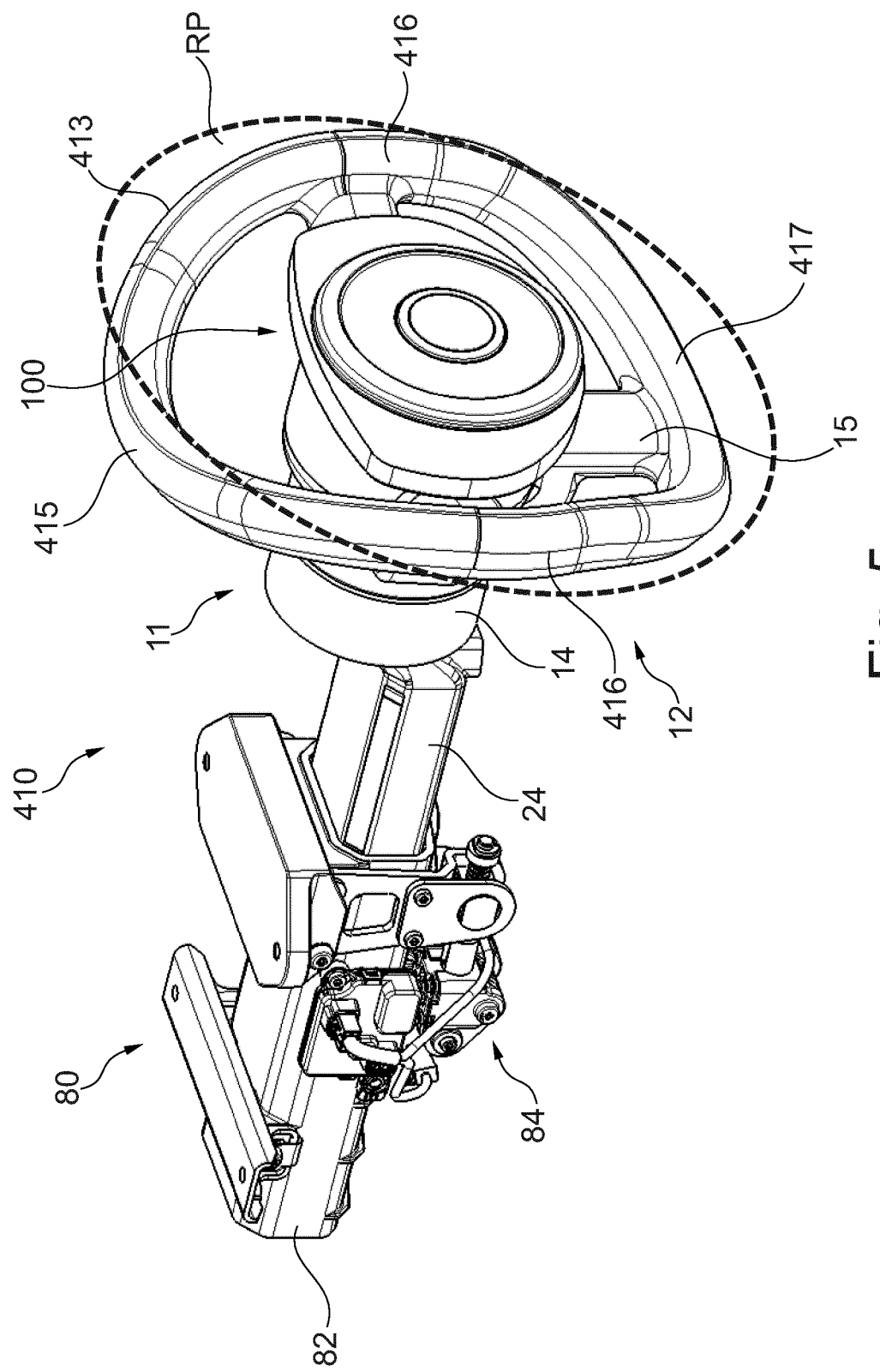
FIG. 5 shows a schematic perspective view of the steering system according to another embodiment of the invention.

FIG. 5 shows a schematic perspective view of the steering system 410 according to another embodiment of the invention. The embodiment shown in FIG. 5 substantially corresponds to the embodiment shown in FIGS. 1A to 1C. Yet, unlike the embodiment of FIGS. 1A to 1C, the embodiment of FIG. 5 comprises a steering wheel rim 413 having a non-planar structure relating to a planar reference plane RP. The steering wheel rim 413 is formed as a substantially circular, ring shaped, closed structure forming a grip portion to the vehicle driver. The non-planar steering wheel rim 413 comprises an upper portion 415 that is inclined in a direction towards the vehicle dashboard 400 relative to a middle portion 416 of the steering wheel rim 413. The steering wheel rim 413 comprises a bottom portion 417 that is inclined in a direction towards the vehicle dashboard 400 relative to the middle portion 416 of the steering wheel rim 413.

Figure 12:
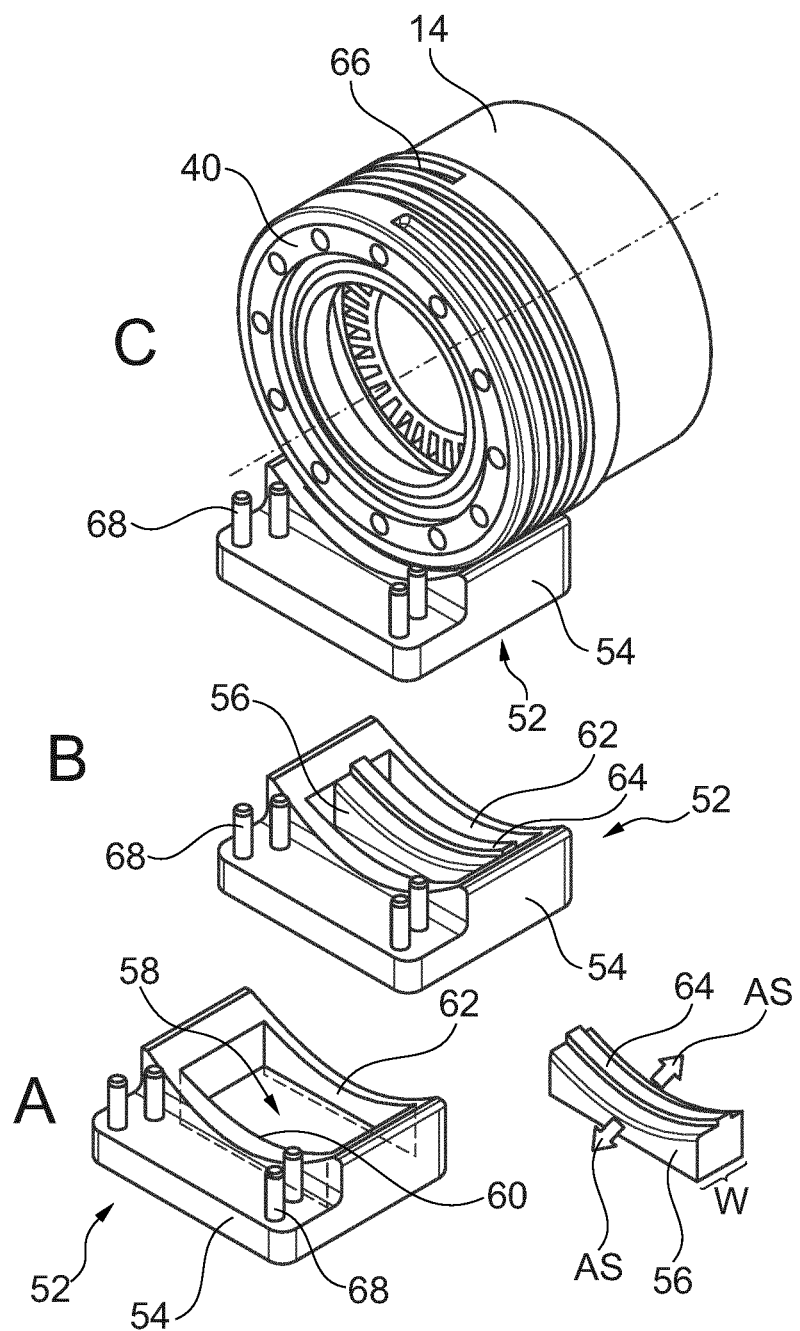
FIGS. 12A to 12C show schematic views of the steering wheel rotation limiting device and the steering wheel hub for illustrating the functional principle of the steering wheel rotation limiting device.

The steering wheel rim 413 of FIG. 5 can have a total angle of rotation of 550°. The total angle of rotation can be mechanically limited by a rotation limiting device 52 as shown in FIGS. 12A to 12C.

FIGS. 6A and 6B show the steering system 410 of FIG. 5 in retracted positions together with a dashboard design. The dashboard design includes an additional extension part 405 so that in a retracted state of the steering wheel arrangement 11, the dashboard and the steering wheel 12 at least partially abut. Preferably, the dashboard and the steering wheel 12 can be formed at least partially complementary so as to allow optimal abutment. As can be seen in FIGS. 6A and 6B, the non-planar steering wheel rim 413 at least partially wraps around a dashboard curvature, which leads to interior space gain (indicated by arrows SG).

The steering system 410 is configured completely column stalk control free.

Figure 7A:
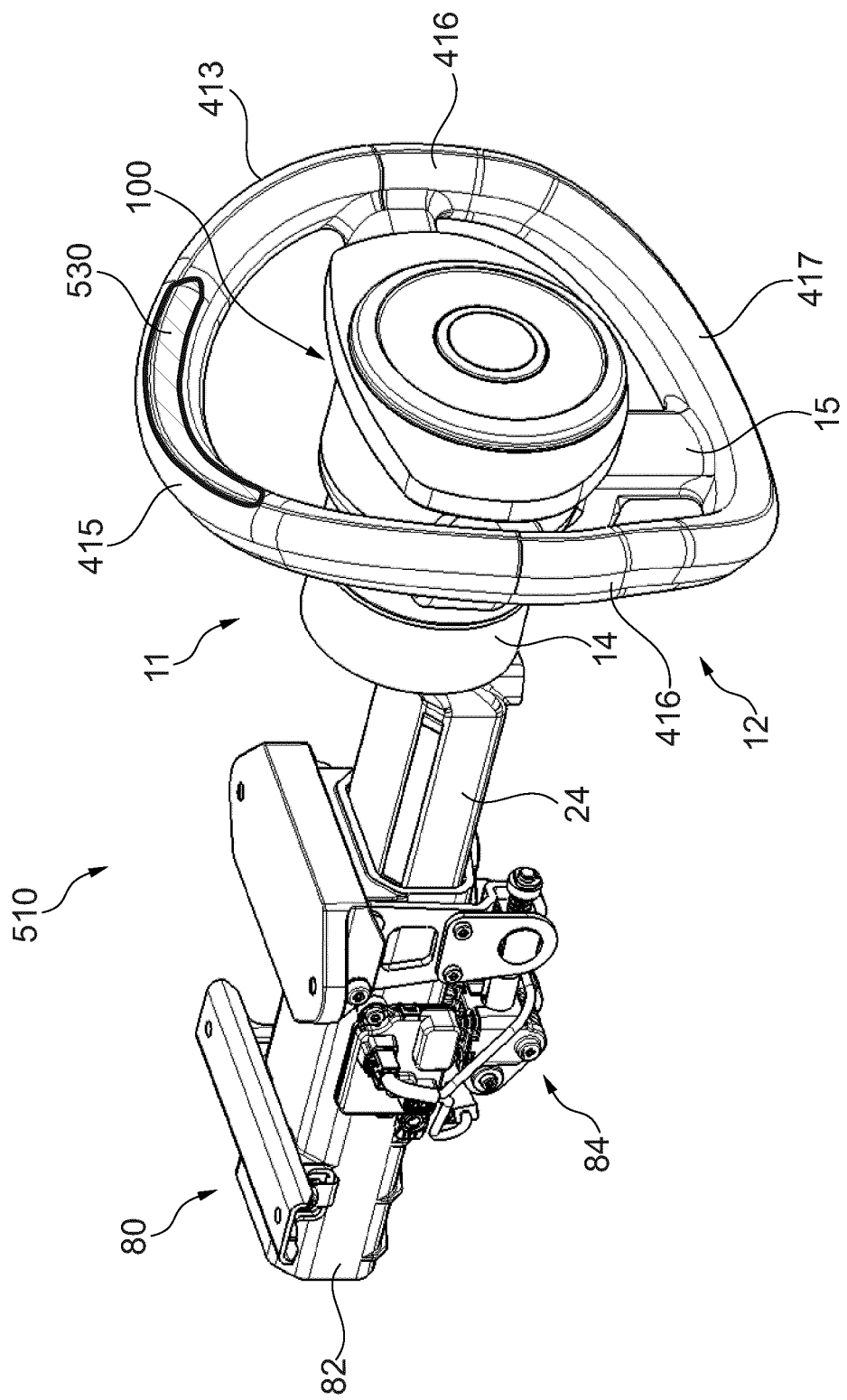

FIGS. 7A to 7C show a steering system 510 according to another embodiment of the invention. Steering system 510 of FIGS. 7A to 7C substantially corresponds to steering system 410 of FIGS. 5 to 6B. Steering system 510 is provided with a display unit 530 mounted on the steering wheel rim 413. More precisely, the display unit 530 is arranged on the inclined upper portion 415 of the steering wheel rim 413. This increases a focal distance FD relating to the display unit 530, which contributes to optimal perceptibility of the display unit 530.

A further embodiment of a steering system 610 according to the invention is shown in FIG. 8. In contrast to the embodiment of FIGS. 7A to 7C, the steering system 610 of FIG. 8 is provided with an open top portion 630. Nonetheless, the overall structure of the steering wheel rim 413 is mirror symmetrical in this and all other shown embodiments (this is not necessary but preferable). By providing the steering wheel rim 413 with an open top portion 630, the steering wheel rim 413 in this embodiment consequently comprises two inclined upper portions 415, one on each side of the open top portion 630.

A further embodiment of a steering system 710 according to the invention is shown in FIG. 9. In contrast to the embodiment of FIGS. 7A to 7C, the steering system 710 of FIG. 9 is provided with an open bottom portion 730. Nonetheless, the overall structure of the steering wheel rim 413 is mirror symmetrical in this and all other shown embodiments (this is not necessary but preferable). By providing the steering wheel rim 413 with an open bottom portion 730, the steering wheel rim 413 in this embodiment consequently comprises two inclined bottom portions 417, one on each side of the open top portion 730.

Even though, no display unit is shown in the embodiments of FIGS. 8 and 9, a display unit (e.g. as shown in FIG. 7) could be provided on the steering wheel rim 413, in particular on the respective closed inclined upper or bottom portion.

Figure 10:
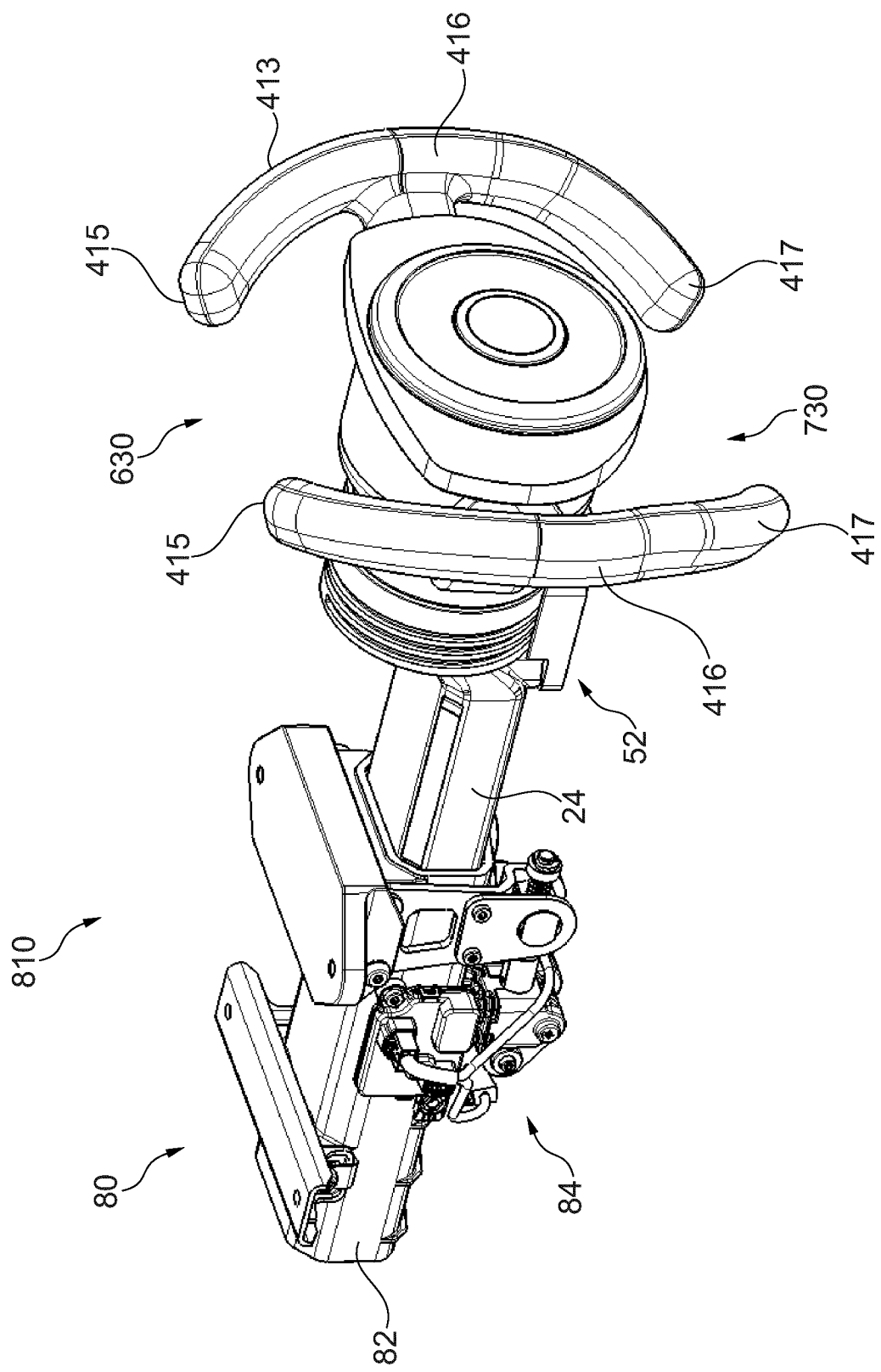
FIG. 10 shows a schematic perspective view of the steering system according to another embodiment of the invention.

FIG. 10 shows a further embodiment of a steering system 810 according to the invention. In contrast to the embodiment of FIGS. 7A to 7C, the steering system 810 of FIG. 10 is provided with an open top portion 630 and an open bottom portion 730. Nonetheless, the overall structure of the steering wheel rim 413 is mirror symmetrical in this and all other shown embodiments (this is not necessary but preferable). By providing the steering wheel rim 413 with an open top portion 630 and an open bottom portion 730, the steering wheel rim 413 in this embodiment consequently comprises two inclined upper portions 415, one on each side of the open top portion 630, and two inclined bottom portions 417, one on each side of the open top portion 730.

FIGS. 11A to 11F show schematic views of a steering system 910 with additional features according to an embodiment of the invention. As can be seen in FIGS. 11A to 11F, the steering system 910 is a steer-by-wire steering system that has no direct mechanical connection for transferring a driver's steering commands from a steering wheel 12 of the steering system 10 to the wheels (not shown) of the vehicle. Instead, the mechanical connections are replaced by an electro-mechanical arrangement.

In addition to the steering wheel 12 with steering wheel rim 13 and spokes 15, a steering arrangement 11 of the steering system 910 comprises a steering wheel hub 14 mechanically connected with the steering wheel 12. The steering wheel hub 14 and the steering wheel 12 are non-rotatable relative to each other, but can be rotated together about a central axis A of the steering wheel arrangement 11. The steering wheel 12 is removably attached to the steering wheel hub 14 in a non-rotatable manner by fixing elements 16 in form of screws. More precisely, the steering wheel 12 is provided with an internal armature 18 inside the spoke 15, wherein the fixing elements 16 extend through bores 20 of the internal armature 18 into internally threaded blind holes 22 provided in the steering wheel hub 14.

The steering wheel hub 14 is rotatably supported on a rigid steering system support column 24 of the steering system 910, more precisely on an aligned section 26 of the steering system support column 24. Besides the aligned section 26, the steering system support column 24 comprises an off-axis section 28 connected with the aligned section 26. The off-axis section 28 is axially spaced from the aligned section 26 and from the steering wheel hub 14, while the steering wheel hub 14 overlaps and is located coaxial to the aligned section 26. The off-axis section 28 has a first longitudinal axis L1 that is off-set and parallel to the central axis A. The aligned section 26 has a second longitudinal axis L2. The aligned section 26 of the steering system support column 24 is aligned with or coaxial to the steering wheel hub 14 and to the steering wheel 12, i.e. the second longitudinal axis L2 corresponds to the central axis A. The off-axis section 28 and the aligned section 26 are fixedly connected by a connection portion 30 extending transversally to both the first longitudinal axis L1 and the second longitudinal axis L2.

The steering wheel hub 14 is rotatably mounted on the aligned section 26 of the steering system support column 24 by a first bearing arrangement 32 and a second bearing arrangement 34, the second bearing arrangement 34 being axially spaced from the first bearing arrangement 32. For example, the first bearing arrangement 32 and/or the second bearing arrangement 34 can be a ball bearing or a roller bearing.

The first bearing arrangement 32 is supported on a protruding flange portion 36 of the aligned section 26 of the steering system support column 24, which protrudes radially outward from the outer circumferential surface of the aligned section 26. The protruding flange portion 36 provides a circular ring-shaped first bearing surface for supporting the first bearing arrangement 32. The protruding flange portion 36 is arranged in the vicinity of the connection portion 30, i.e. in a transition region between the aligned section 26 and the connection portion 30. Consequently, the first bearing arrangement 32 is axially located at a first end portion of the aligned section 26 oriented towards the connection portion 30.

The second bearing arrangement 34 is supported on a circular ring-shaped portion 38 of the aligned section 26 of the steering system support column 24. The circular ring-shaped portion 38 is formed in an area of the aligned section 26 following the steering wheel 12 and extending towards the protruding flange portion 36. The circular ring-shaped portion 38 provides a second bearing surface for the second bearing arrangement 34. Thus, the second bearing arrangement 34 is axially located at a second end portion of the aligned section 26 opposing the first end portion.

The first bearing arrangement 32 is mounted between the protruding flange portion 36 of the aligned section 26 and the steering wheel hub 14 via a support bushing 40 arranged between the first bearing arrangement 32 and the inner circumferential surface of the steering wheel hub 14.

Figure 11A:
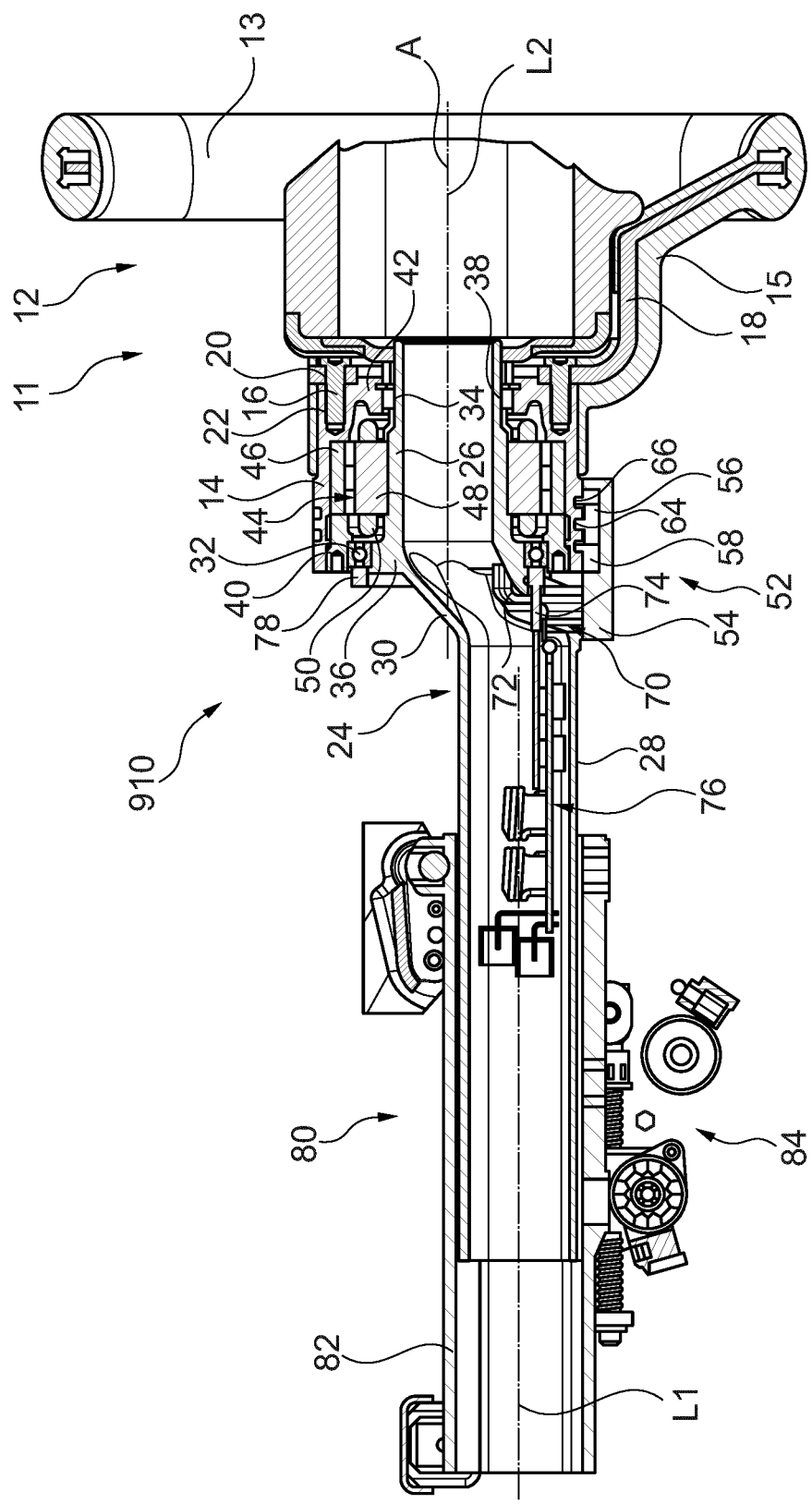
FIGS. 11A to 11F show schematic views of a steering system according to another embodiment of the invention.
Figure 11B:
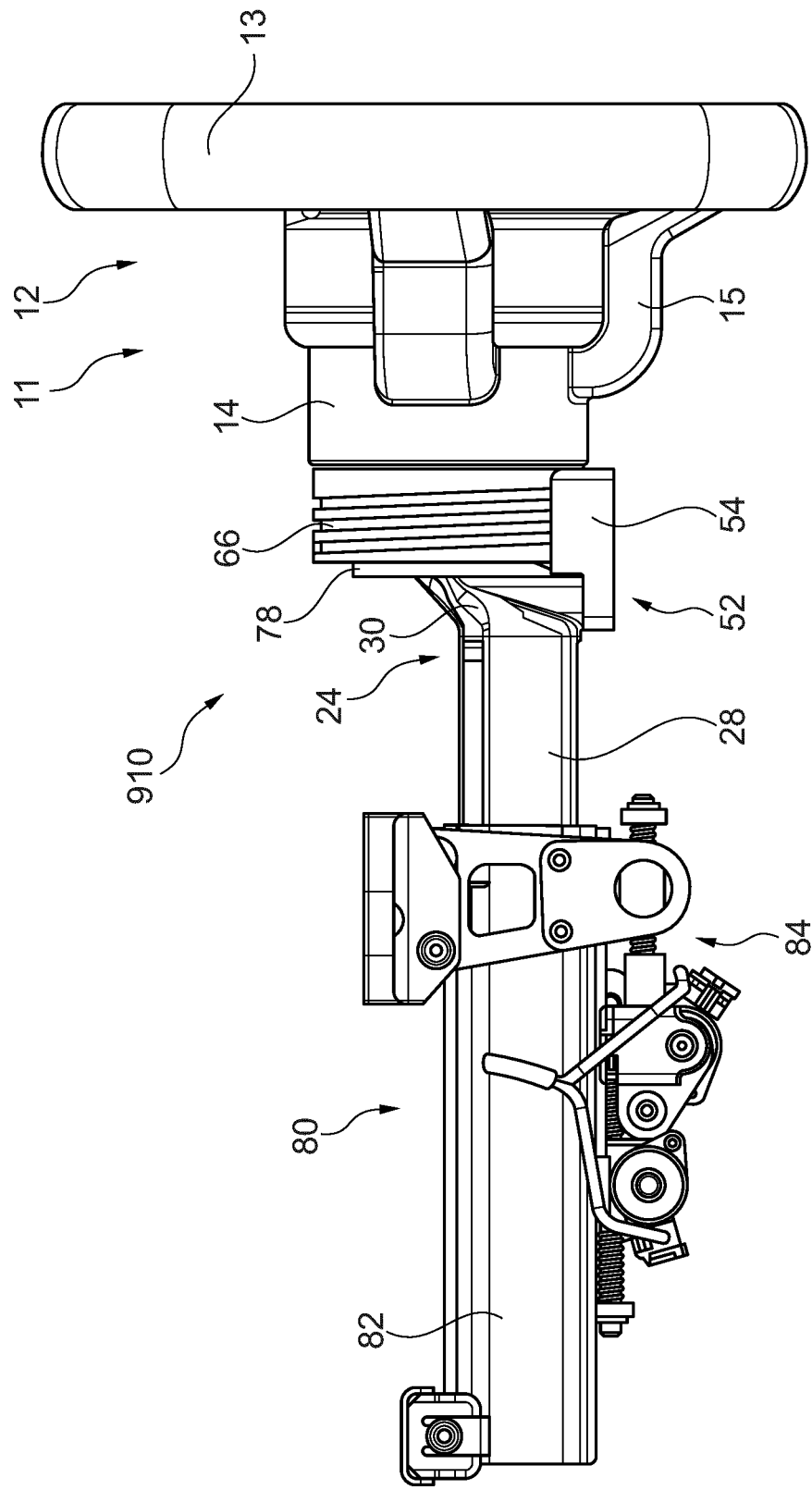
Figure 11C:
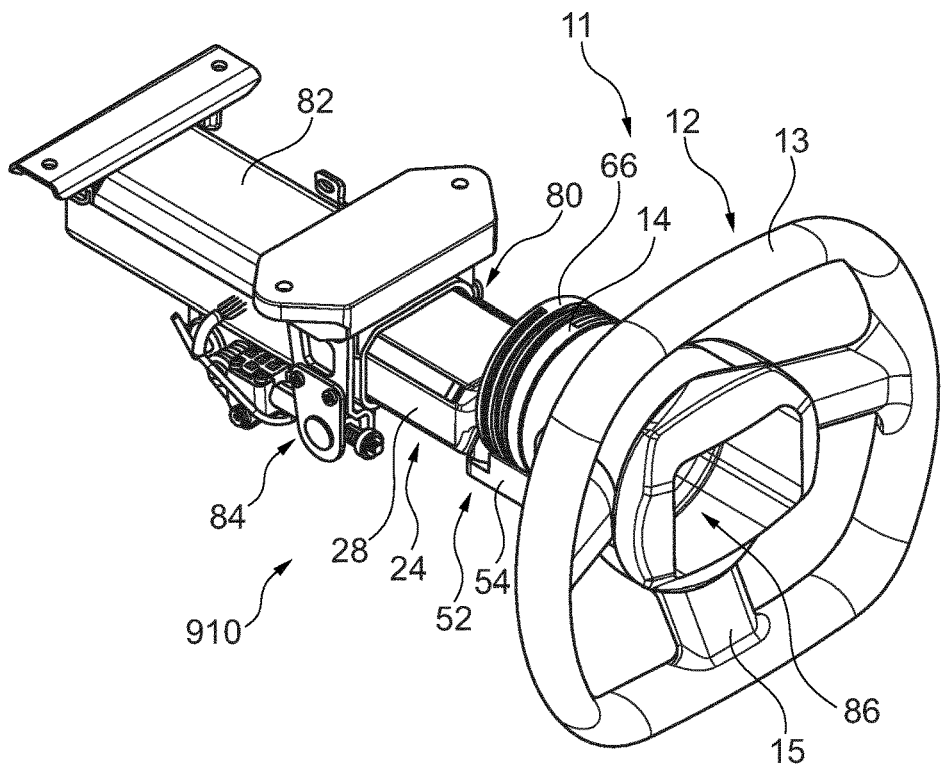
Figure 11D:
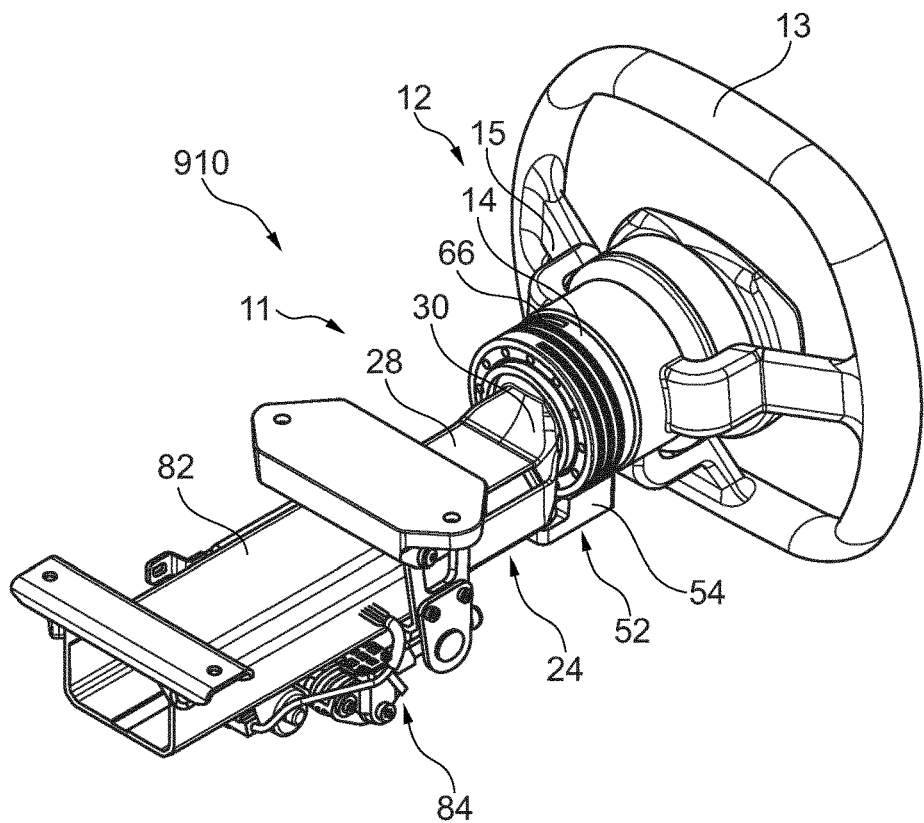
Figure 11E:
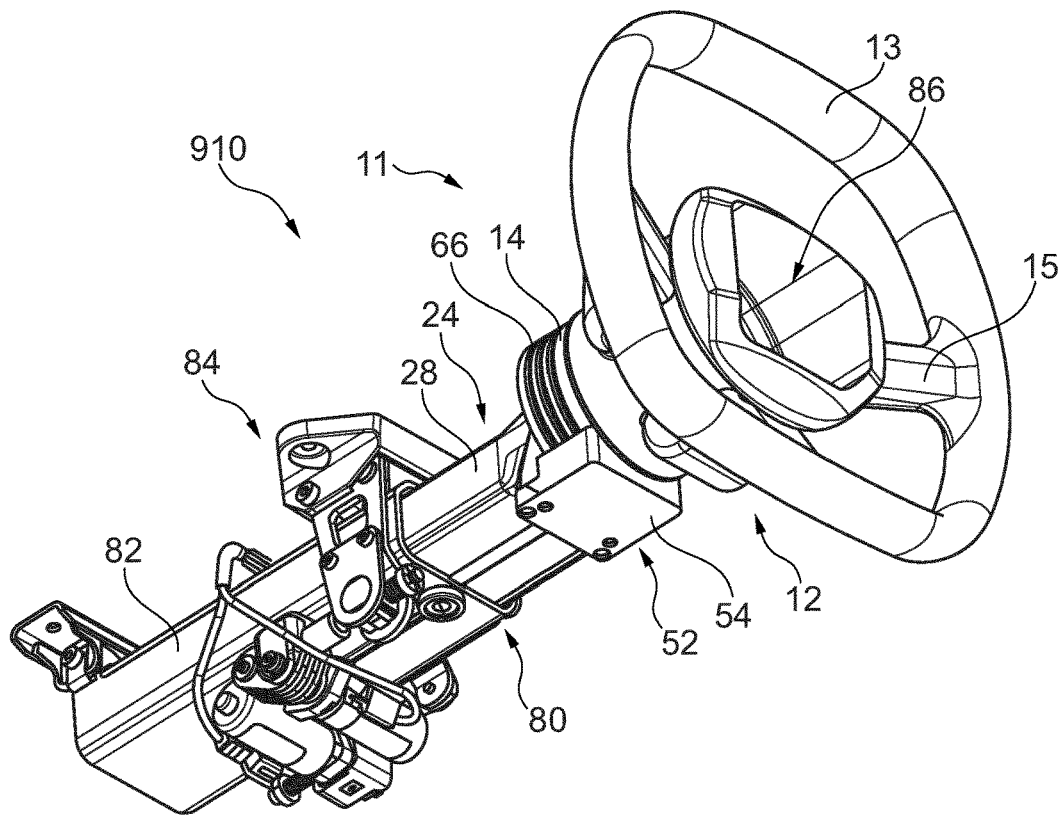
Figure 11F:
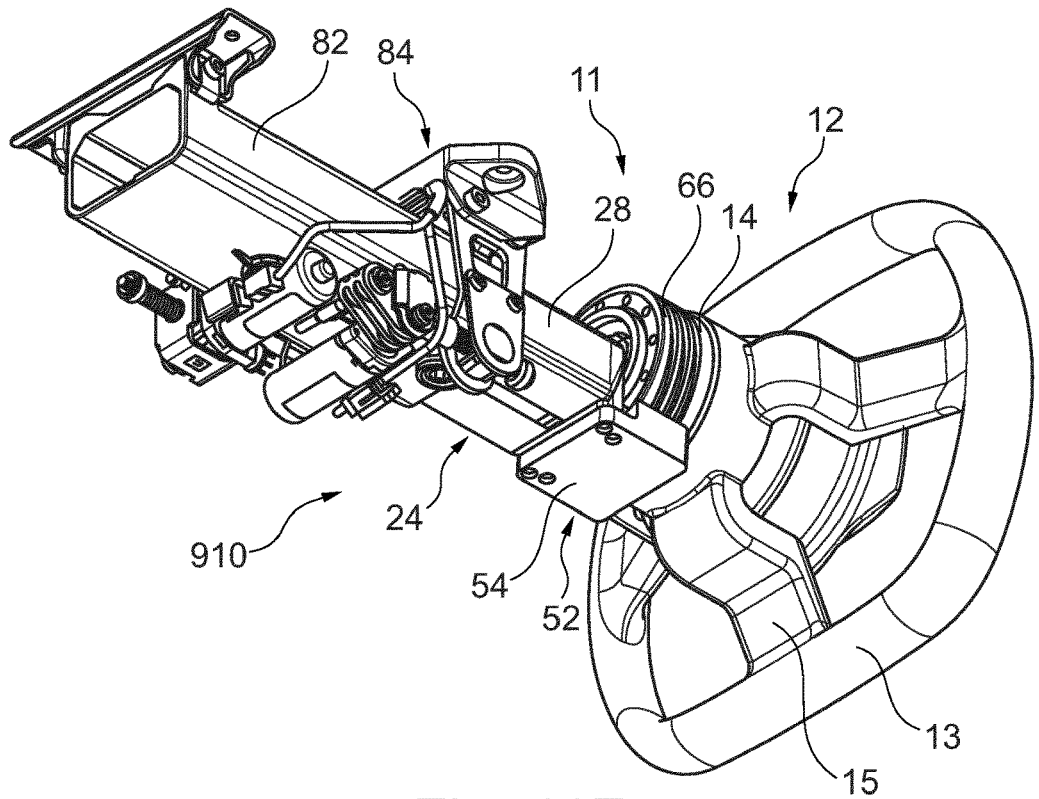

The second bearing arrangement 34 is mounted directly between the circular ring-shaped portion 38 of the aligned section 26 and the steering wheel hub 14. To this, the steering wheel hub 14 is provided with an inwardly protruding flange portion 42 that provides a counter bearing surface for the second bearing arrangement 34. At the same time, the inwardly protruding flange portion 42 covers components located inside the steering wheel hub 14. As can be seen in FIG. 11A, the blind holes 22 for receiving the fixing elements 16 extend into or through the inwardly protruding flange portion 42.

The steering system 910 further comprises a torque feedback device 44 including an electric machine having a rotor 46 and a stator 48 with stator windings 50. The torque feedback device 44 can be operated to produce resistance torque to the rotation of the steering wheel 12 so as to simulate the resistance torque present in conventional steering systems. In other words, the torque produced by the torque feedback device 44 can counteract the rotational force applied to the steering wheel 12 by a driver.

In the shown embodiment, the electric machine is an outer rotor electric machine comprising an outer rotor 46 and an inner stator 48. The rotor 46 is fixed to an inner circumferential surface of the steering wheel hub 14. Thus, the rotor 46 is rotatable together with the steering wheel hub 14 about the central axis A. The rotor 46 is non-rotatable relative to the steering wheel hub 14. The stator 48 is fixed to the rotatably stationary (i.e. non-rotatable) aligned section 26 of the steering system support column 24. Thus, the steering wheel hub 14 and the rotor 46 can rotate together around the stator 48 and the aligned section 26.

The electric machine of the torque feedback device 44 is arranged inside the steering wheel hub 14. The torque feedback device 44 is radially enclosed and thus covered by the steering wheel hub 14 (the inner circumferential surface of the steering wheel hub 14) and the aligned section 26 of the steering system support column 24 (the outer circumferential surface of the aligned section 26). The torque feedback device 44 is axially located between the protruding flange portion 36 of the aligned section 26 and the circular ring-shaped portion 38 of the aligned section 26. The torque feedback device 44 is axially enclosed and thus covered by the protruding flange portion 36 of the aligned section 26, the first bearing arrangement 32 and the support bushing 40 on one side and by the inwardly protruding flange portion 42 of the steering wheel hub 14 and the second bearing arrangement 34 on the other side.

The arrangement, configuration and support of the steering wheel hub 14, the steering wheel 12, the torque feedback device 44 and the steering system support column 24 provides a very compact structure. More precisely, as shown in FIG. 11A, various components are arranged at least partially parallel to each other, with respect to their radial and/or axial arrangement.

Namely, the fixing elements 16 are arranged at different radial positions, i.e. different radial heights, than the stator windings 50, with respect to the central axis A. Hence, the fixing elements 16 and the blind holes 22 at least partially overlap the stator windings 50 in the axial direction. The stator windings 50 can be arranged closer to the central axis A than the fixing elements 16.

Further, the second bearing arrangement 34 is arranged at a different radial position, i.e. a different radial height, than the stator windings 50 and at a different radial position, i.e. a different radial height, than the fixing elements 16, with respect to the central axis A. In the shown embodiment, the fixing elements 16 overlap the second bearing arrangement 34 in the axial direction. The second bearing arrangement 34 can be arranged closer to the central axis A than the stator windings 50 and can be arranged closer to the central axis A than the fixing elements 16.

Further, the first bearing arrangement 32 is arranged at a different radial position, i.e. a different radial height, than the second bearing arrangement 34 and at a different radial position, i.e. a different radial height, than the fixing elements 16, with respect to the central axis A. The first bearing arrangement 32 is arranged at a similar radial position as the start windings 50, with respect to the central axis A. The first bearing arrangement 32 can be arranged closer to the central axis A than the stator fixing elements 16 and can be spaced farther from to the central axis A than the second bearing arrangement 34.

The fixing elements 16 are arranged at similar radial positions as the outer rotor 46 of the torque feedback device 44, with respect to the central axis A. This limits the radial extension of the steering system 910 in the region of the torque feedback device 44.

The steering system 910 further comprises a steering wheel rotation limiting device 52 for limiting rotation of the steering wheel hub 14 and the steering wheel 12. The steering wheel rotation limiting device 52 is fixed to the steering system support column 24 and is arranged radially offset to the steering wheel hub 14, more precisely adjacent to the outer circumferential surface of the steering wheel hub 14. The steering wheel rotation limiting device 52 is non-rotatable relative to the steering system support column 24.

The steering wheel rotation limiting device 52 comprises a base 54 and a sliding element 56 arranged inside a compartment 58 formed in the base 54. The sliding element 56 is axially slidable relative to the base 54 and relative to the steering wheel hub 14. The sliding element 56 can slide between the two opposing end stop surfaces 60, 62 (see FIGS. 12A to 12C) of the steering wheel rotation limiting device 52. The sliding element 56 comprises a projection 64 that engages a spiral groove 66 formed on the outer circumferential surface of the steering wheel hub 14. By the interaction of the projection 64 and the spiral groove 66, rotation of the steering wheel hub 14 causes axial movement of the sliding element 56. Likewise, abutment of the sliding element 56 with one of the two end stop surfaces 60, 62 blocks further movement of the sliding element 56 in a certain direction and thus blocks further rotation of the steering wheel hub 14 in a certain direction of rotation. Hence, the steering wheel rotation limiting device 52 is configured to restrict rotation of the steering wheel hub 14 and of the steering wheel 12 connected therewith.

The base 54 of the steering wheel rotation limiting device 52 is fixed to the off-axis section 28 of the steering system support column 24 by screws 68 (see FIGS. 11A to 11F). The steering wheel rotation limiting device 52, more precisely the base 54, extends in the axial direction from the off-axis section 28 of the steering system support column 24 to the steering wheel hub 14 so that the compartment 58 is arranged between and enclosed by the base 54 and the outer circumferential surface of the steering wheel hub 14.

Functions and further details of the steering wheel rotation limiting device 52 will be described in the context of FIGS. 12A to 12C.

The base 54 of the steering wheel rotation limiting device 52 covers an opening 70 configured in the off-axis section 28 of the steering system support column 24. More precisely, the opening 70 is arranged in another transition region between the off-axis section 28 and the connection portion 30. The opening 70 provides access to electric machine phase connections 72 and to electric steering wheel angle sensor connections 74 for service and maintenance purposes. The electric machine phase connections 72 connect the electric machine of the torque feedback device 44 with a control unit/control electronics 76. The electric steering wheel angle sensor connections 74 connect a steering wheel angle sensor 78 with the control unit/control electronics 76.

The control unit 76 is arranged inside the hollow tubular off-axis section 28 of the steering system support column 24. More precisely, the control unit 76 is arranged in a portion of the off-axis section 28 close to the connection portion 30 so as to locate the control unit 76 and the electric machine close to each other.

The steering wheel angle sensor 78 is configured to measure a present steering angle and thus to detect the driver's steering command that is to be transmitted electronically to actuator/s for actuating/steering the wheels in line with this command. The steering wheel angle sensor 78 is arranged adjacent or lateral to the first bearing arrangement 32.

The steering system support column 24 forms an inner member of a tubular telescope arrangement 80. The outer member of the tubular telescope arrangement 80 is embodied by a vehicle support column 82. In particular, the off-axis section 28 is mounted axially slidable inside the outer member/vehicle support column 82 of the tubular telescope arrangement 80. Thus, the steering system support column 24 is translationally displaceable relative to the vehicle support column 82 and relative to a vehicle body, but is non-rotatable and non-pivotable relative to the vehicle support column 82.

The steering system support column 24 is connected to the vehicle body (not shown) via the vehicle support column 82 by brackets, axial adjustment elements and vertical adjustment elements 84. Consequently, the steering system support column 24 and all components supported thereon are only translationally displaceable with respect to the first longitudinal axis L1 independent of the vehicle support column 82. Further, the steering system support column 24 and all components supported thereon are radially displaceable/pivotable relative to the vehicle body dependent on the vehicle support column 82, i.e. the adjustability/displaceability of the vehicle support column 82.

The steering system support column 24 has a hollow tubular shape. The steering system support column 24 is formed as a rigid one-piece component and is preferably made of metal. As can be seen in FIGS. 11A to 11F, which show different perspective views of the steering system 910, at least the off-axis section 28 of the steering system support column 24 has a substantially rectangular cross-sectional area. Such a shape can be particularly advantageous for accommodating and attaching the control unit 76. Similar to the off-axis section 28, the vehicle support column 82 that forms the tubular telescope arrangement 80 together with the off-axis section 28 has a substantially rectangular cross-sectional area.

The connection portion 30 of the steering system support column 24 forms a tapering transition that tapers from the off-axis section 28 towards the aligned section 26. The aligned section 26 has a smaller diameter than the off-axis section 28. The aligned section 26 has a substantially circular cross-sectional area.

As can be further seen, the steering wheel 12 is provided with an internal space 86 for accommodating the center part (not shown, but shown and denoted with reference sign 100 in FIGS. 1A to 2B). The center part as well as auxiliary components, such as a wiring harness, can extend into the hollow, tubular aligned section 26. The center part as well as the auxiliary components can thus be arranged in and/or attached to the inside of the aligned section 26 of the steering system support column 24.

FIGS. 12A to 12C serve to disclose details concerning the function and configuration of the steering wheel rotation limiting device 52. FIG. 12A shows the components of the steering wheel rotation limiting device 52 separately, i.e. in an exploded view. FIG. 12B shows the components of the steering wheel rotation limiting device 52 in an assembled state. FIG. 12C shows the steering wheel rotation limiting device 52 mounted to or in interaction with the steering wheel hub 14.

As can be seen in FIGS. 12A to 12C, four screws 68 extend through base 54 so as to securely fix the steering wheel rotation limiting device 52 to the steering system support column 24. The base 54 has a compartment 58 formed therein. Two axially opposing side surfaces of the compartment 58 constitute the end stop surfaces 60, 62. The compartment 58 is formed partially complementary to the sliding element 56 that can be arranged therein (see FIG. 12B). Thus, the compartment 58, more precisely the bottom and the lateral surfaces of the compartment 58, restricts movability of the sliding element 56 to an axial slidability between the two end stop surfaces 60, 62 (indicated by arrows AS). The two end stop surfaces 60, 62 limit the slidability of the sliding element 56 in the axial directions. When the sliding element 56 abuts one of the two end stop surfaces 60, 62, its further movement in the current direction is blocked and the sliding element 56 can only move in an opposite axial direction, i.e. towards the respective opposing end stop surface 60, 62. A surface oriented towards the steering wheel hub 14, in a mounted state, is curved and substantially complementary to a corresponding part of the outer circumferential surface of the steering wheel hub 14.

The sliding element 56 engages the spiral groove 66 formed in the outer circumferential surface of the steering wheel hub 14 via the projection 64. Projection 64 is formed as a spiral ridge, adapted to the shape and dimension of the spiral groove 66. The sliding element 56 interacts with the steering wheel hub 14 via the spiral groove 66. When the steering wheel 12 and consequently the steering wheel hub 14 rotate, the sliding element 56 is dragged inside the compartment 58 in an axial direction according to one of arrows AS. The sliding element 56 slides until the rotation of the steering wheel hub 14 stops or until a further movement is blocked by an abutment of the sliding element 56 with one of the two end stop surfaces 60, 62. Blocking of further axial movement of the sliding element 56 consequently blocks further rotation of the steering wheel hub 14 and thus of the steering wheel 12 in a direction of rotation that would cause a further axial movement of the sliding element 56 towards the currently blocking end stop surface 60, 62.

As indicated in FIG. 12A, the sliding element 56 has an axial width W. The axial width W of the sliding element 56 determines the free space inside the compartment 58 between the sliding element 56 and the end stop surfaces 60, 62. Thus, by adapting or choosing the axial width W of the sliding element 56, the maximum travel distance, i.e. the maximum axial movability, of the sliding element 56 between the two end stop surfaces 60, 62 is adjustable. Thus, by merely replacing the sliding element 56 and adapting its axial width W and the dimensions and geometry of the projection 64, the steering wheel rotation limiting device 56 can be used flexibly for different vehicle configurations. In particular, the axial width W can be chosen in accordance with one or more of the following parameters: a length of the spiral groove 66, a pitch of the spiral groove 66, a distance between the two opposing end stop surfaces 60, 62, and a circumferential length of the steering wheel hub 14.

| List of reference signs | | | |
|---|---|---|---|
| 10 | steering system | 44 | torque feedback device |
| 11 | steering wheel arrangement | 46 | rotor |
| 12 | steering wheel | 48 | stator |
| 13 | steering wheel rim | 50 | stator windings |
| 14 | steering wheel hub | 52 | steering wheel rotation limiting device |
| 15 | spoke | 54 | base |
| 16 | fixing elements | 56 | sliding element |
| 18 | armature | 58 | compartment |
| 20 | through bores | 60 | end stop surface |
| 22 | blind holes | 62 | end stop surface |
| 24 | steering system support column | 64 | projection |
| 26 | aligned section | 66 | spiral groove |
| 28 | off-axis section | 68 | screws |
| 30 | connection portion | 70 | opening |
| 32 | first bearing arrangement | 72 | electric machine phase connections |
| 34 | second bearing arrangement | 74 | electric steering wheel angle sensor connections |
| 36 | protruding flange portion | 76 | control unit |
| 38 | circular ring-shaped portion | 78 | steering wheel angle sensor |
| 40 | support bushing | 80 | tubular telescope arrangement |
| 42 | inwardly protruding flange portion | 82 | vehicle support column |
| 84 | adjustment elements | 530 | display unit |
| 86 | internal space | 610 | further steering system |
| 88 | end portion | 630 | open top portion |
| 100 | center part | 710 | further steering system |
| 102 | center pad | 730 | open bottom portion |
| 104A to 110B | steering wheel controls | 810 | further steering system |
| 210A, 210B | alternative horn control positions | 910 | further steering system |
| 300, 302 | driver aid controls | L1 | first longitudinal axis |
| 400 | dashboard contour | L2 | second longitudinal axis |
| 402 | prior art dashboard contour | W | axial width |
| 404 | additional extension part | A | central axis |
| 405 | additional extension part | AS | axial direction |
| 410 | further steering system | R | rotation direction |
| 413 | further steering wheel rim | RP | reference plane |
| 415 | inclined upper portion | SG | space gain |
| 416 | middle portion | FD | focal distance |
| 417 | inclined bottom portion | | |
| 510 | further steering system | | |

What is claimed is:

1. A steering system for a vehicle, the steering system comprising a steering wheel arrangement having a central axis and being reversibly retractable in a direction towards a dashboard of the vehicle and extendable in a direction away from the dashboard of the vehicle;
   wherein the steering wheel arrangement comprises
   a steering wheel having a steering wheel rim and at least one spoke,
   a steering wheel center part being provided with a plurality of steering wheel controls, the steering wheel center part being non-rotatable about the central axis, and
   a steering wheel hub fixedly connected with the steering wheel by the at least one spoke and extending from the steering wheel towards the dashboard of the vehicle, the steering wheel hub and the steering wheel being rotatable about a central axis;
   wherein the steering wheel rim has a non-planar configuration and has a total angle of rotation of 720° or less, and
   wherein the steering system has a variable steering ratio.

2. The steering system according to claim 1, wherein the steering wheel rim is at least partially arc-shaped.

3. The steering system according to claim 1, wherein the steering wheel rim is mirror symmetrical.

4. The steering system according to claim 1, at least one of
   wherein the steering wheel rim comprises at least one upper portion that is inclined in a direction towards the dashboard relative to a middle portion of the steering wheel rim, or
   wherein the steering wheel rim comprises at least one bottom portion that is inclined in a direction towards the dashboard relative to a middle portion of the steering wheel rim.

5. The steering system according to claim 4, wherein the steering wheel rim is provided with at least one display unit mounted on the steering wheel rim, and wherein the at least one display unit is arranged on the at least one upper portion or the at least one bottom portion.

6. The steering system according to claim 1, wherein the steering system has a maximum steering ratio selected from the following ranges: between 10:1 and 12:1, between 8:1 and 10:1, between 6:1 and 8:1, or between 5:1 and 6:1.

7. The steering system according to claim 1, wherein the steering wheel arrangement is column stalk control free.

8. The steering system according to claim 1, wherein the steering wheel arrangement comprises a torque feedback device including an electric machine having a rotor and a stator, the rotor being attached to the steering wheel hub and being rotatable about the central axis, and the stator being fixedly attached to a steering system support column which is non-rotatable about the central axis.

9. The steering system according to claim 1, wherein the steering wheel rim is provided with at least one display unit mounted on the steering wheel rim.

10. The steering system according to claim 9, wherein the at least one display unit has the shape of a circular segment.

11. The steering system according to claim 1, wherein the steering wheel rim is provided with at least one of an open top portion or an open bottom portion.

12. The steering system according to claim 1, wherein a rear surface of the steering wheel that faces the dashboard of the vehicle is formed at least partially complementary to a dashboard front surface facing the rear surface of the steering wheel.

13. The steering system according to claim 1, wherein the vehicle is an autonomous vehicle.

14. The steering system according to claim 1, wherein the total angle of rotation is 600° or less.

15. The steering system according to claim 1, wherein the variable steering ratio is automatically adjustable such that a greatest steering ratio is between 20% and 40% higher than a lowest steering ratio.

16. The steering system according to claim 15, wherein the greatest steering ratio is between 25% and 35% higher than the lowest steering ratio.

17. The steering system according to claim 16, wherein the greatest steering ratio is 30% higher than the lowest steering ratio.

* * * * *